US012744608B2

(12) United States Patent
Prakash et al.

(10) Patent No.: US 12,744,608 B2
(45) Date of Patent: Sep. 22, 2026

(54) FRAGMENTING PUBLIC WARNING SYSTEM MESSAGES IN A WIRELESS SYSTEM

(71) Applicant: Outdoor Wireless Networks LLC, Richardson, TX (US)

(72) Inventors: Shiva Prakash, Bangalore (IN); Minyan Shi, Bolton, MA (US)

(73) Assignee: Outdoor Wireless Networks LLC, Richardson, TX (US)

(*) Notice: Subject to any disclaimer, the term of this patent is extended or adjusted under 35 U.S.C. 154(b) by 395 days.

(21) Appl. No.: 18/471,172

(22) Filed: Sep. 20, 2023

(65) Prior Publication Data

US 2024/0106554 A1 Mar. 28, 2024

Related U.S. Application Data

(60) Provisional application No. 63/376,552, filed on Sep. 21, 2022.

(51) Int. Cl.

*H04H 20/59* (2008.01)
*H04H 20/71* (2008.01)
*H04L 5/00* (2006.01)
*H04W 4/90* (2018.01)

(52) U.S. Cl.

CPC ........... *H04H 20/59* (2013.01); *H04H 20/71* (2013.01); *H04L 5/0044* (2013.01); *H04W 4/90* (2018.02)

(58) Field of Classification Search

CPC ...... H04H 20/59; H04H 20/71; H04L 5/0044; H04W 4/90

See application file for complete search history.

(56) References Cited

U.S. PATENT DOCUMENTS

2021/0274334 A1* 9/2021 Bergström ............ H04W 4/021
2021/0306424 A1* 9/2021 Anvari .................... H04L 67/12
2023/0308850 A1* 9/2023 Nader .................. H04W 76/50

OTHER PUBLICATIONS

ETSI, 5G; NR; Physical layer procedures for data (3GPP TS 38.214 version 17.5.0 Release 17), Apr. 2023, pp. Cover through 235.
ETSI, LTE; Evolved Universal Terrestrial Radio Access (E-UTRA); Multiplexing and channel coding (GPP TX 36.212 version 17.1.0 Release 17), Apr. 2022, pp. Cover through 263 (Parts 1-2 of 2).
ETSI, LTE; Evolved Universal Terrestrial Radio Access (E-UTRA); Physical layer procedures (GPP TS 36.213 version 14.17.0 Release 14), Sep. 2021, pp. Cover through 475.
ETSI, LTE; Evolved Universal Terrestrial Radio Access (E-UTRA); Radio Resource Control (RRC); Protocol specification (3GPP TS 36.331 version 17.4.0 Release 17), Apr. 2023, pp. Cover through 1142 (Parts 1-8 of 8).

* cited by examiner

*Primary Examiner* — Derrick V Rose
(74) *Attorney, Agent, or Firm* — Fogg & Powers LLC

(57) ABSTRACT

A base station includes a plurality of remote units (RUs), each being configured to exchange RF signals with at least one UE. The C-RAN also includes a controller communicatively coupled to the plurality of RUs via a fronthaul interface. The controller is configured to receive a public warning system (PWS) alert message. The controller is also configured to determine a number of bytes, based on a channel bandwidth of a wireless channel used by the base station, for each of a plurality of system information block messages. The plurality of system information block messages are broadcast wirelessly to the at least one UE.

40 Claims, 7 Drawing Sheets

FRAGMENTING PUBLIC WARNING SYSTEM MESSAGES IN A WIRELESS SYSTEM

CROSS-REFERENCE TO RELATED APPLICATIONS

This application claims the benefit of U.S. Provisional Patent Application Ser. No. 63/376,552 filed on Sep. 21, 2022, entitled "FRAGMENTING PUBLIC WARNING SYSTEM MESSAGES IN A WIRELESS SYSTEM", the entirety of which is incorporated herein by reference.

BACKGROUND

In a cloud radio access network (C-RAN), geographically-separate remote units are controlled by a centralized unit and provide wireless service to user equipment (UEs). In a C-RAN, the centralized unit may communicate with the remote units via a fronthaul network (also referred to as a "fronthaul interface"). It may be desirable to optimize transmission of public warning system (PWS) messages as described herein.

SUMMARY

In a first configuration, a base station includes a plurality of remote units (RUs), each being configured to exchange RF signals with at least one UE. The C-RAN also includes a controller communicatively coupled to the plurality of RUs via a fronthaul interface. The controller is configured to receive a public warning system (PWS) alert message. The controller is also configured to determine a number of bytes, based on a channel bandwidth of a wireless channel used by the base station, for each of a plurality of system information block messages. The plurality of system information block messages are broadcast wirelessly to the at least one UE.

In a second configuration, a base station includes a plurality of remote units (RUs), each being configured to exchange RF signals with at least one UE. The C-RAN also includes a controller communicatively coupled to the plurality of RUs via a fronthaul interface. The controller is configured to determine a minimum number of system information block messages required to broadcast a warning message (WM) portion and a warning area co-ordinate (WAC) portion of a PWS alert message. The controller is also configured to allocate a maximum number of bytes in each system information block message to the WAC portion of the PWS alert message based on a comparison of a size of the WM portion of the PWS alert message and the minimum number of system information block messages required to transmit the WM portion and the WAC portion of the PWS alert message. The controller is also configured to allocate a second number of bytes in each system information block message, after allocating for the WAC portion, to the WM portion of the PWS alert message. The controller is also configured to form the system information block messages with WM data in the second number of bytes and WAC data in the maximum number of bytes.

BRIEF DESCRIPTION OF DRAWINGS

Understanding that the drawings depict only exemplary configurations and are not therefore to be considered limiting in scope, the exemplary configurations will be described with additional specificity and detail through the use of the accompanying drawings, in which.

Figure 1:
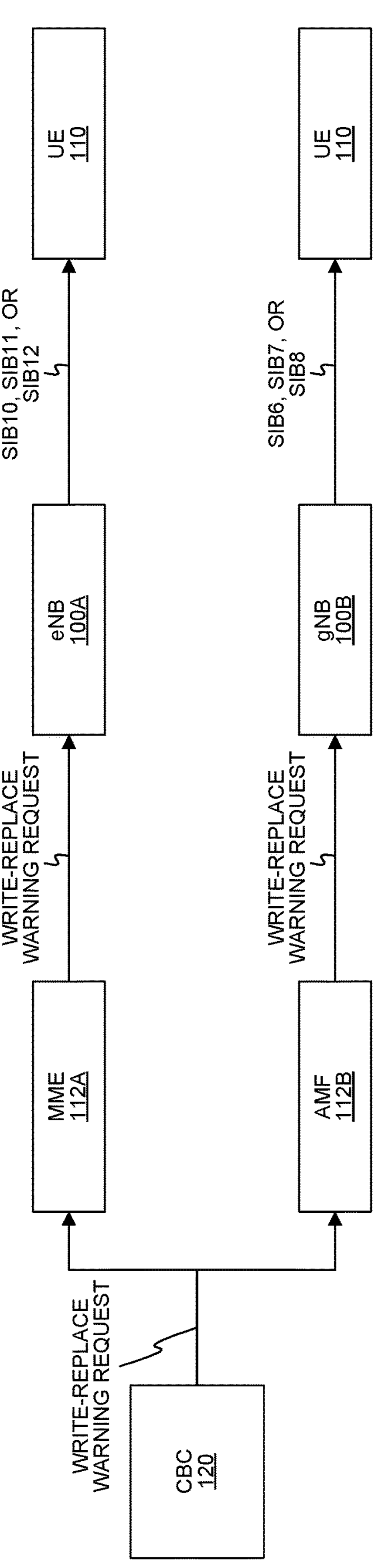
FIG. 1 is a block diagram illustrating message flow of a public warning message being broadcasted in a wireless communication system.

In accordance with common practice, the various described features are not drawn to scale but are drawn to emphasize specific features relevant to the exemplary configurations.

DETAILED DESCRIPTION

A cloud radio access network (C-RAN) is one way to implement a distributed RAN. Typically, for each cell implemented by a C-RAN, one or more controllers (also called "baseband controllers", or "central units" and "distributed units") interact with multiple remote units (RUs) in order to provide wireless service to various items of user equipment (UEs). In a C-RAN, the RUs may communicate with at least one controller via a fronthaul interface. The fronthaul interface may utilize at least one computing device (e.g., switch) that facilitates communication between the RUs and DUs (in 5G) or a baseband controller (in 4G). It should be noted that the present systems and methods may also be applicable to non-distributed base stations.

Cellular networks, both 4G and 5G, are integrated with public warning systems (PWS) that support the broadcast of public warning messages to their mobile users. The two major PWS s are the Earthquake and Tsunami Warning System (ETWS) of Japan and Commercial Mobile Alert System (CMAS) of the United States. PWS alert messages may be sent over-the-air in System Information Blocks (SIB s), e.g., transmitted using the broadcast control channel (BCCH) mapped on the downlink shared channel (DL-SCH), which in turn mapped on physical downlink shared channel (PDSCH).

CMAS alert messages include a warning message (WM) and optionally a corresponding warning area co-ordinate (WAC), while the ETWS alert does not includes a WAC portion. Per Third Generation Partnership Project (3GPP) specifications, the maximum size of the warning message (WM) and corresponding warning area co-ordinate (WAC) in the PWSs may be larger than the maximum size of a SIBx message. For example, the maximum size of a WM and its corresponding WAC may be 9600 bytes and 1024 bytes in size, respectively, and the maximum size of a SIBx message might be limited to 277 bytes for LTE and 372 bytes for 5G.

Therefore, PWS alert messages (ETWS and CMAS) may be segmented before they are broadcasted over an air interface.

However, 3GPP does not indicate exactly how the segmentation/fragmentation should be performed, though 3GPP allows use of up to 64 SIBx (SIB12 or LTE, SIB8 for 5G) messages to transmit a PWS message. Accordingly, in order to transmit PWS alert messages in the most bandwidth-efficient way (or using the fewest number of segments) possible, the present systems and methods (1) determine a segment size (e.g., in bytes) used to transmit a PWS alert message over the air based on channel bandwidth; and (2) for a given segment size, apportion the bytes in each segment between a warning message (WM) and a corresponding warning area coordinate (WAC) if present.

As used herein, the terms "SIB message", "SIBx message" (Where x=10, 11, 12 for 4G LTE, and x=6, 7, 8 for 5G systems), "SIBx segment", "SIBx fragment", "segment", and "fragment" may be used interchangeably to refer to portions of a PWS alert message carried over-the-air from eNBs and/or gNBs to UEs, e.g., that are sent in System Information Blocks (SIB s).

Example System Utilizing Public Warning System

FIG. 1 is a block diagram illustrating message flow of a public warning message being broadcasted in a wireless communication system. The 3GPP has defined different message formats for transmitting ETWS and CMAS messages over the air interface, such as LTE System Information Block (SIB) 10, 11, and 5G SIB 6, 7 for ETWS primary and secondary messages; and LTE SIB12 and 5G SIB 8 for CMAS messages.

In FIG. 1, a cell broadcast center (CBC) 120 issues an alert (in the form of Write-Replace Warning Request (WRWR) messages) to network core entit(ies) (e.g., a mobility management entity (MME) 112A in 4G or an Access and Mobility Management Function (AMF) 112B in 5G), which sends the WRWR messages to eNodeB(s) 100A in 4G or gNodeB(s) 100B in 5G, e.g., the MME 112A and/or AMF 112B may include the CBC WRWR message as a field in messages to the eNB 100A and/or gNB 100B. The eNB 100A and/or gNB 100B then broadcast SIBx messages to the UEs 110 over the air.

As noted above, the maximum size of the warning message (WM) and corresponding warning area co-ordinate (WAC) in the warning messages may be larger than the maximum size of a SIBx message. The present systems and methods improve how the PWS messages are transmitted over-the-air in the minimum number of SIBx messages while complying with the various system restraints, such as the maximum size of a SIBx message, the maximum number of a SIBx message, the minimum size of the WM in a SIBx message, etc.

Example 5G C-RAN

Figure 2A:
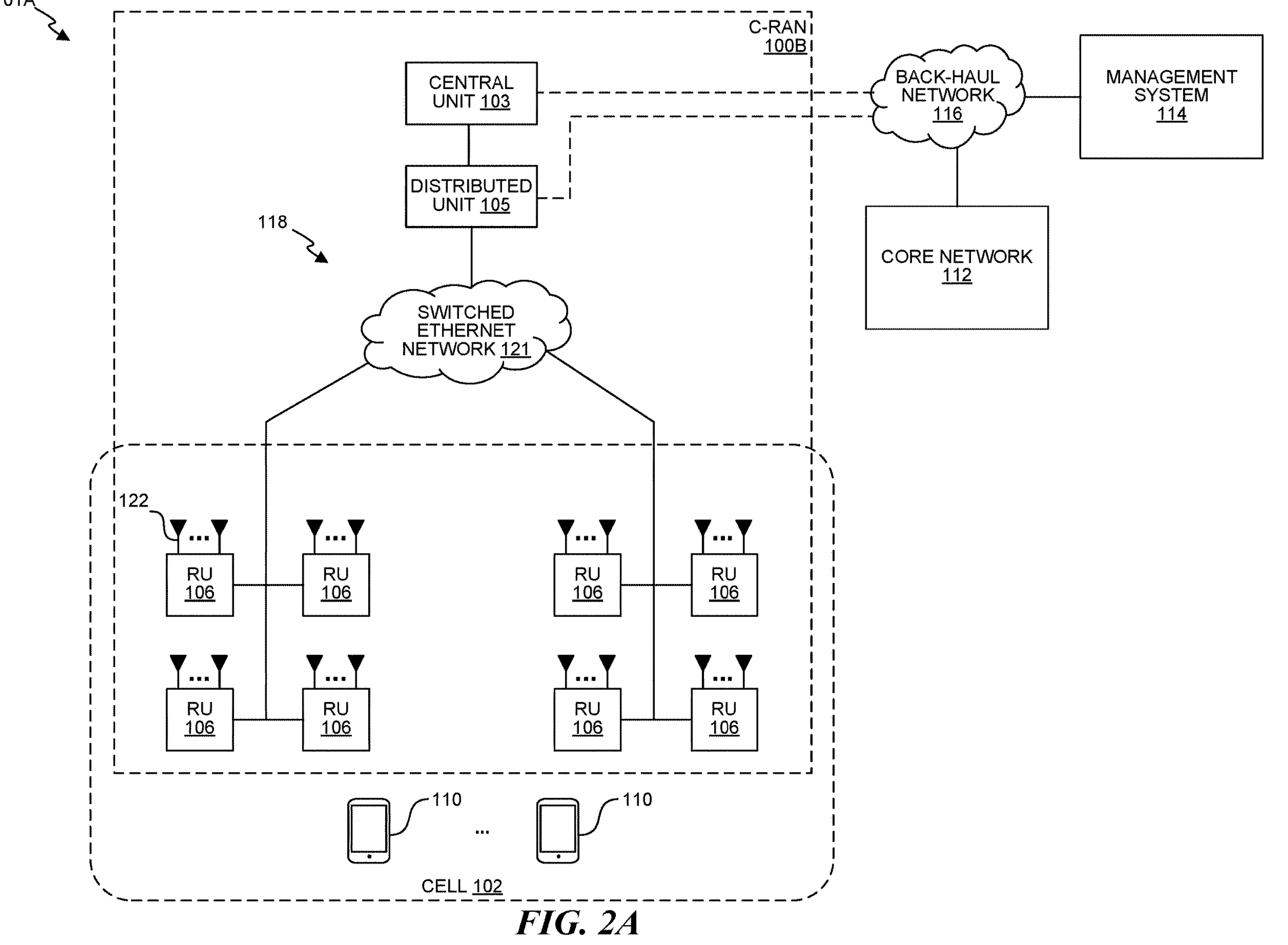
FIG. 2A is a block diagram illustrating an exemplary configuration of a Next Generation NodeB (also referred to here as an "gNodeB" or "gNB") implemented using a C-RAN.

FIG. 2A is a block diagram illustrating an exemplary configuration of a Next Generation NodeB (also referred to here as an "gNodeB" or "gNB") 100B implemented using a C-RAN. In the exemplary configuration of FIG. 2A, the gNB 100B can be implemented as a Fifth Generation New Radio (5G NR) RAN that supports a 5G NR air interface in accordance with the 5G NR specifications and protocols promulgated by the 3rd Generation Partnership Project (3GPP). Thus, in some configurations, the C-RAN 100B can also be referred to as a "Next Generation Node B", "gNodeB", or "gNB".

In the exemplary embodiment shown in FIG. 2A, the gNB 100B employs a centralized or cloud RAN (C-RAN) architecture for each cell (or sector) served by the gNB 100B, with the following logical nodes: at least one control unit (CU) 103, at least one distributed unit (DU) 105, and multiple radio units (RUs) 106. Each RU 106 is remotely located from each CU 103 and DU 105 serving it. Also, in this exemplary embodiment, at least one of the RUs 106 is remotely located from at least one other RU 106 serving that cell 102. In some configurations, all RUs 106 serve the same cell 102 or cells 102. Every RU 106 in the system 100B may transmit the same or different cell-ID for the cell(s) 102 they all serve.

The C-RAN 100B can be implemented in accordance with one or more public standards and specifications. In some configurations, the C-RAN 100B is implemented using the logical RAN nodes, functional splits, and fronthaul interfaces defined by the O-RAN Alliance. In such an O-RAN example, each CU 103, DU 105, and RU 106 can be implemented as an O-RAN central unit (CU), O-RAN distributed unit (DU), and O-RAN radio unit (RU), respectively, in accordance with the O-RAN specifications.

That is, each CU 103 comprises a logical node hosting Packet Data Convergence Protocol (PDCP), Radio Resource Control (RRC), Service Data Adaptation Protocol (SDAP), and other control functions. Therefore, each CU 103 implements the gNB controller functions such as the transfer of user data, mobility control, radio access network sharing, positioning, session management, etc. The CU(s) 103 control the operation of the Distributed Units (DUs) 105 over an interface (including F1-c and F1-u for the control plane and user plane, respectively).

In FIG. 2A, the C-RAN 100B includes a single CU 103, which handles control plane functions, user plane functions, some non-real-time functions, and/or Packet Data Convergence Protocol (PDCP) processing. The CU 103 (in the C-RAN 100B) may communicate with at least one wireless service provider's Next Generation Cores (NGC) 112 using 5G NGc and 5G NGu interfaces. In some 5G configurations (not shown in FIG. 2A), a CU 103 is split between a CU-CP that handles control plane functions and a CU-UP that handles user plane functions.

In some configurations, each DU 105 comprises a logical node hosting (performing processing for) Radio Link Control (RLC) and Media Access Control (MAC) layers, as well as optionally the upper or higher portion of the Physical (PHY) layer (where the PHY layer is split between the DU 105 and RU 106). In other words, the DUs 105 implement a subset of the gNB functions, depending on the functional split (between CU 103 and DU 105). In some configurations, the L3 processing (of the 5G air interface) may be implemented in the CU 103 and the L2 processing (of the 5G air interface) may be implemented in the DU 105. As noted above, a DU 105 (or a CU 103) may act as a "radio controller" for one or more RUs 106 in a 5G C-RAN 100B operating according to O-RAN specifications.

Each RU 106 comprises a logical node hosting the portion of the PHY layer not implemented in the DU 105 (that is, the lower portion of the PHY layer) as well as implementing the basic RF and antenna functions. In some 5G configurations, the RUs (RUs) 106 may communicate baseband signal data to the DUs 105 on an NG-iq interface. In some 5G configurations, the RUs 106 may implement at least some of the L1 and/or L2 processing. In some configurations, the RUs 106 may have multiple ETHERNET ports and can communicate with multiple switches.

Although the CU 103, DU 105, and RUs 106 are described as separate logical entities, one or more of them can be implemented together using shared physical hardware and/or software. For example, in the exemplary embodiment shown in FIG. 2A, for each cell 102, the CU 103 and DU 105 serving that cell 102 could be physically implemented together using shared hardware and/or software, whereas each RU 106 would be physically implemented using separate hardware and/or software. Alternatively, the CU(s) 103 may be remotely located from the DU(s) 105.

Each RU 106 includes or is coupled to one or more antennas 122 via which downlink RF signals are radiated to various items of user equipment (UE) and via which uplink RF signals transmitted by UEs 110 are received.

The CU 103 and/or DU(s) 105 may be coupled to a core network 112 of the associated wireless network operator over an appropriate back-haul network 116 (such as the Internet). Also, each DU 105 is communicatively coupled to the RUs 106 served by it using a front-haul network 118. Each of the DU(s) 105 and RUs 106 include one or more network interfaces (not shown) to enable the DU(s) 105 and RUs 106 to communicate over the front-haul network 118.

In one implementation, the front-haul 118 that communicatively couples the DU(s) 105 to the RUs 106 is implemented using a switched ETHERNET network 121. In such an implementation, each DU 105 and RU 106 includes one or more ETHERNET interfaces for communicating over the switched ETHERNET network 121 used for the front-haul 118. However, it is to be understood that the front-haul 118 between each DU 105 and the RUs 106 served by it can be implemented in other ways.

Each CU 103, DU 105, and RU 106, (and the functionality described as being included therein), as well as any other device in the system 101A more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" or "circuits" configured to implement at least some of the associated functionality. When implemented in software, such software can be implemented in software or firmware executing on one or more suitable programmable processors or configuring a programmable device (for example, processors or devices included in or used to implement special-purpose hardware, general-purpose hardware, and/or a virtual platform). Such hardware or software (or portions thereof) can be implemented in other ways (for example, in an application specific integrated circuit (ASIC), etc.). Also, the RF functionality can be implemented using one or more RF integrated circuits (RFICs) and/or discrete components. Each CU 103, DU 105, RU 106, and the system 101A more generally, can be implemented in other ways.

As noted above, in the exemplary configuration described here in connection with FIG. 2A, the C-RAN 100B is implemented as a 5G NR RAN that supports a 5G NR wireless interface to wirelessly communicate with the UEs 110.

More specifically, in the exemplary embodiment described here in connection with FIG. 2A, the 5G NR wireless interface may support the use of beamforming for wirelessly communicating with the UEs 110 in both the downlink and uplink directions using the millimeter wave (mmWave) radio frequency (RF) range defined for 5G NR (Frequency Range 2 or "FR2"), e.g., ranging from 24 GHz to 40 or 100 GHz. 5G NR RAN systems typically make use of fine beams and beamforming, especially when FR2 is used. To perform such beamforming, each RU 106 comprises an array of multiple, spatially separated antennas 122. When FR2 is used, the spacing of the antennas 122 in the array is on the order of several millimeters (as opposed to several centimeters as is the case when FR1 is used) and can be implemented in a convenient fashion.

In some configurations, the C-RAN 100B may implement uplink combining in which a group of RUs 106 (e.g., up to four) receive RF signals from a particular UE 110 and a DU 105 and/or CU 103 combines them (e.g., using a maximum likelihood ratio combining) into a single uplink signal. Additionally or alternatively, the C-RAN 100B may implement downlink combining in which a group of RUs 106 send downlink RF signals to a particular UE 110, which combines them (e.g., using a maximum likelihood ratio combining) into a single downlink signal.

A management system 114 may be communicatively coupled to the CU(s) 103, DU(s) 105, and/or RUs 106, for example, via the back-haul network 116 and/or the front-haul network 118. The management system 114 may assist in managing and/or configuring the C-RAN 100B. A hierarchical architecture can be used for management-plane ("M-plane") communications. When a hierarchical architecture is used, the management system 114 can send and receive M-plane (management) communications to and from the DU 105, which in turn forwards relevant M-plane communications to and from the RUs 106 as needed. Alternatively, a direct architecture can also be used for M-plane communications. When a direct architecture is used, the management system 114 can communicate directly with the RUs 106 (without having the M-plane communications forwarded by the CU 103 or DU 105). A hybrid architecture can also be used in which some M-plane communications are communicated using a hierarchical architecture and some M-plane communications are communicated using a direct architecture. Proprietary protocols and interfaces can be used for such M-plane communications. Also, protocols and interfaces that are specified by standards such as O-RAN can be used for such M-plane communications.

Example 4G C-RAN

Figure 2B:
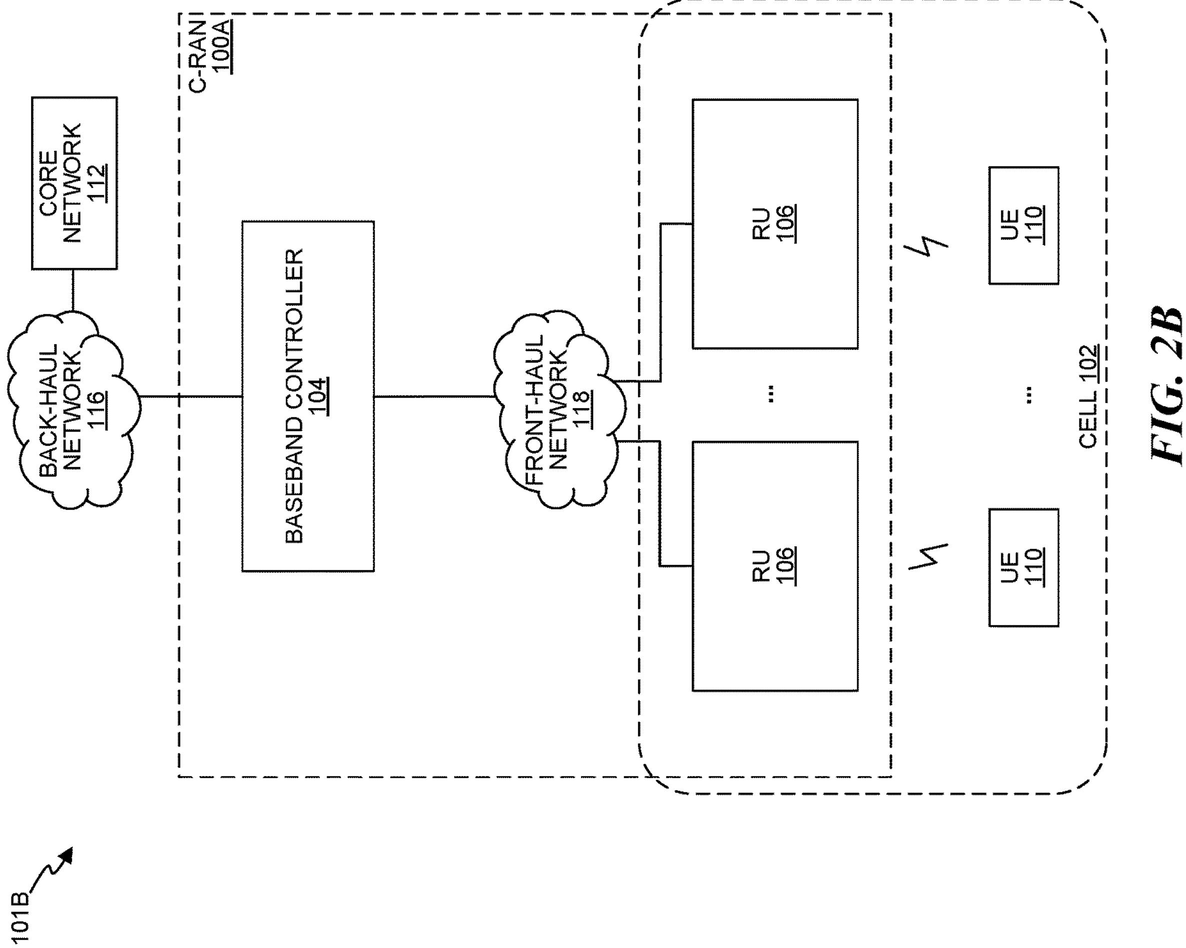
FIG. 2B is a block diagram illustrating another exemplary configuration of an Evolved Node B (also referred to here as an "eNodeB" or "eNB") implemented using a C-RAN that employs at least one baseband unit and one or more radio units.

FIG. 2B is a block diagram illustrating another exemplary configuration of an Evolved Node B 100A (also referred to here as an "eNodeB" or "eNB") implemented using a C-RAN that employs at least one baseband unit 104 and one or more radio units 106. The eNodeB 100A may provide wireless service using the Long Term Evolution (LTE) air interface.

LTE is a standard developed by the 3GPP standards organization. In this configuration, the baseband controller 104 and RUs 106 together are used to implement an eNodeB 100A. An eNB 100A may be used to provide UEs 110 with mobile access to the wireless network operator's core network 112 to enable UEs 110 to wirelessly communicate data and voice (using, for example, Voice over LTE (VoLTE) technology). However, it should be noted that the present systems and methods may be used with other wireless protocols, e.g., the system 100A may be implemented as a 3GPP 5G RAN providing wireless service using a 5G air interface, as described below.

The RUs 106 may be deployed at a site to provide wireless coverage and capacity for one or more wireless network operators. The site may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium, or a densely-populated downtown area). In some configurations, the site is at least partially (and optionally entirely) indoors, but other alternatives are possible.

The C-RAN 100A may include a baseband unit 104, which may also be referred to as "baseband controller" 104, or just "controller" 104. Each radio unit (RU) 106 may include or be coupled to at least one antenna used to radiate downlink RF signals to user equipment (UEs) 110 and receive uplink RF signals transmitted by UEs 110. The baseband controller 104 may optionally be physically located remotely from the site, e.g., in a centralized bank of baseband controllers 104. Additionally, the RUs 106 may be physically separated from each other within the site, although they are each communicatively coupled to the baseband controller 104 via a front-haul network 118 (or just "front-haul"). Communication relating to L1 functions generally relies on the front-haul network 118 interface. As before, every RU 106 in the system 100A may transmit the same or different cell-ID for each of the cell(s) 102 they all serve, depending on the number of carriers and frequency reuse layers. As noted above, a baseband controller 104 may be referred to as a "radio controller" for one or more RUs 106 in a 4G C-RAN 100A operating according to O-RAN specifications.

Each UE 110 may be a computing device with at least one processor that executes instructions stored in memory, e.g., a mobile phone, tablet computer, mobile media device, mobile gaming device, laptop computer, vehicle-based computer, a desktop computer, etc. Each baseband controller 104 and RU 106 may be a computing device with at least one processor that executes instructions stored in memory. Furthermore, each RU 106 may optionally implement one or more RU instances, e.g., a processing core that executes instructions that implement the functionality of an RU 106.

The C-RAN 100A may optionally implement frequency reuse where the same frequency resource(s) are used for multiple sets of UEs 110, each set of UEs 110 being under a different, geographically diverse set of RUs 106, e.g., all operating in the same cell 102 or cells 102.

The system 100A is coupled to a core network 112 of each wireless network operator over an appropriate back-haul network 116. For example, the Internet may be used for back-haul 116 between the system 100A and each core network 112. However, it is understood that the back-haul network 116 can be implemented in other ways. Communication relating to L3 functions generally relies on the back-haul network 116 interface. Each of the back-haul network 116 and/or the front-haul network 118 described herein may be implemented with one or more network elements, such as switches, routers, and/or other networking devices. For example, the back-haul network 116 and/or the front-haul network 118 may be implemented as a switched ETHERNET network.

Also, in an exemplary LTE configuration, each core network 112 may be implemented as an Evolved Packet Core (EPC) 112 comprising standard LTE EPC network devices such as, for example, a mobility management entity (MME) and a Serving Gateway (SGW) and, optionally, a Home eNB gateway (HeNB GW) (not shown) and a Security Gateway (SeGW or SecGW) (not shown).

Moreover, in an exemplary LTE configuration, each baseband controller 104 may communicate with the MME and SGW in the EPC core network 112 using the LTE Si interface and communicates with eNBs using the LTE X2 interface. For example, the baseband controller 104 can communicate with an outdoor macro eNB (not shown) via the LTE X2 interface.

Each baseband controller 104 and radio unit 106 can be implemented so as to use an air interface that supports one or more of frequency-division duplexing (FDD) and/or time-division duplexing (TDD). Also, the baseband controller 104 and the radio units 106 can be implemented to use an air interface that supports one or more of the multiple-input-multiple-output (MIMO), single-input-single-output (SISO), single-input-multiple-output (SIMO), and/or beam forming schemes. For example, the baseband controller 104 and the radio units 106 can implement one or more of the LTE transmission modes. Moreover, the baseband controller 104 and the radio units 106 can be configured to support multiple air interfaces and/or to support multiple wireless operators.

In some configurations, in-phase, quadrature-phase (I/Q) data representing pre-processed baseband symbols for the air interface is communicated between the baseband controller 104 and the RUs 106. Communicating such baseband I/Q data typically requires a relatively high data rate front haul.

In some configurations, a baseband signal can be pre-processed at a source RU 106 and converted to frequency domain signals (after removing guard band/cyclic prefix data, etc.) in order to effectively manage the front-haul rates, before being sent to the baseband controller 104. Each RU 106 can further reduce the data rates by quantizing such frequency domain signals and reducing the number of bits used to carry such signals and sending the data. In a further simplification, certain symbol data/channel data may be fully processed in the source RU 106 itself and only the resultant information is passed to the baseband controller 104.

The Third Generation Partnership Project (3GPP) has adopted a layered model for the LTE radio access interface. Generally, some combination of the baseband controller 104 and RUs 106 perform analog radio frequency (RF) functions for the air interface as well as digital Layer 1 (L1), Layer 2 (L2), and Layer 3 (L3) (of the 3GPP-defined LTE radio access interface protocol) functions for the air interface. Any suitable split of L1-L3 processing (between the baseband controller 104 and RUs 106) may be implemented. Where baseband signal I/Q data is front-hauled between the baseband controller 104 and the RUs 106, each baseband controller 104 can be configured to perform all or some of the digital L1, L2, and L3 processing for the air interface. In this case, the L1 functions in each RU 106 is configured to implement all or some of the digital L1 processing for the air interface.

Where a front-haul ETHERNET network 118 is not able to deliver the data rate need to front haul (uncompressed) I/Q data, the I/Q data can be compressed prior to being communicated over the ETHERNET network 118, thereby reducing the data rate needed communicate such I/Q data over the ETHERNET network 118.

Data can be front-hauled between the baseband controller 104 and RUs 106 in other ways, for example, using front-haul interfaces and techniques specified in the Common Public Radio Interface (CPRI) and/or Open Base Station Architecture Initiative (OBSAI) family of specifications. The baseband controller 104 described herein may be similar to and/or perform at least some of the functionality of the O-RAN Distributed Unit (O-DU).

Where functionality of a 5G DU 105 is discussed herein, it may equally apply to a 5G CU 103 or a 4G baseband controller 104. Where functionality of a 5G CU 103 is discussed herein, it may equally apply to a 5G DU 105 or a 4G baseband controller 104. Where functionality of a 4G baseband controller 104 is discussed herein, it may equally apply to a 5G DU 105 or a 5G CU 103. Therefore, where a C-RAN 100A-B is described herein, it may include 5G elements (as in FIG. 2A) and/or 4G elements (as in FIG. 2B).

Determining the size of a System Information Block (SIB) Message

An eNB (4G) 100A or gNB (5G) 100B can host several cells where the bandwidth utilized can vary from cell 102 to cell 102. In both 4G LTE and 5G NR, the number of resource blocks ($N_{RB}$) supported for a given channel bandwidth is a function of the channel bandwidth and the sub-carrier spacing (SCS). For 4G only 5, 10, 15, 20 MHz bandwidth are supported and only 15 kHz SCS is supported, $N_{RB}$=25, 50, 75 and 100 for 5, 10, 15, 20 MHz bandwidth respectively. For 5G Tables 1 and 2 below (taken from Tables 5.3.2-1 and 5.3.2-2 in 3GPP Technical Specification 38.101-1 v16.4.0 Release 16, respectively) show the $N_{RB}$ for frequency range 1 (FR1) and frequency range 2 (FR2), respectively, for the given channel bandwidth and SCS. A cell 102 with a larger bandwidth may allocate more resource blocks (RBs) towards the transmission of the SIBx messages without reducing the overall performance.

TABLE 1

Transmission bandwidth configuration $N_{RB}$ for FR1

| SCS (kHz) | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
|---|---|---|---|---|---|---|---|---|---|---|---|---|---|
| 15 | 25 | 52 | 79 | 106 | 133 | 160 | 216 | 270 | N/A | N/A | N/A | N/A | N/A |
| 30 | 11 | 24 | 38 | 51 | 65 | 78 | 106 | 133 | 162 | 189 | 217 | 245 | 273 |
| 60 | N/A | 11 | 18 | 24 | 31 | 38 | 51 | 65 | 79 | 93 | 107 | 121 | 135 |

TABLE 2

Transmission bandwidth configuration $N_{RB}$ for FR2

| SCS (kHz) | 50 MHz | 100 MHz | 200 MHz | 400 MHz |
|---|---|---|---|---|
| 60 | 66 | 132 | 264 | N/A |
| 120 | 32 | 66 | 132 | 264 |

LTE channel bandwidth may be 5, 10, 15 or 20 MHz. 5G systems have a wider range of channel bandwidths (e.g., from 5 to 100 MHz). Accordingly, there is room to optimize SIB message sizes. For example, the SIB message size (e.g., x=7 or 8 for LTE; x=11 or 12 for 5G) may be dynamically chosen based on the bandwidth of given cell or a group of cells. For example, a larger segment size can be chosen for such cells with larger channel bandwidths, and smaller segment size may be chosen for cells with smaller channel bandwidths. Larger SIBx message size (for larger channel bandwidths) speeds the transmission of the actual alert because it requires fewer SIBx messages, while shorter SIBx message size (for smaller channel bandwidths) requires a greater number of segments and therefore a longer transmission time needed.

For over-the-air transmissions, transport block size (TBS) must be chosen. In the case of determining a TBS is the transport block size (or the payload) in bits, which in this case is the SIBx=7, 8, 11, 12 message size. It should be noted that the actual payload would also include additional bytes of header information for the SIBx message. Since this header information is of fixed size and small compared to the actual SIBx message size, the header information is ignored in the following discussion and formulas used, which refer to the TBS size as the SIBx message size.

The 3GPP specification mandates that SIB is to be transmitted using QPSK modulation so that the UEs located at a cell edge may also have high probability to receive SIB correctly, which are critical for the UE 110 to remain in-sync with the base station. Since PWS data too is carried over SIB (i.e. SIB 6, 7, 8 for 5G, SIB 10, 11, 12 for 4G), the PWS alert message also is transmitted using a QPSK.

Equation A quantifies or characterizes the relation between TBS (with CRC) and the number of resource blocks, coding rate and modulation scheme used for the transmission of TBS in either 4G or 5G.

$$TBS=\text{Code Rate}*(Num_{RB}*Bits_{RB})-CRC \qquad \text{Equation (A)}$$

where TBS represents the SIBx message size in bits, CRC is the number cyclic redundancy check bits (e.g., 24); $Num_{RB}$ is the number of PRBs used to transmit the TBS with CRC. $Bits_{RB}=N_{symbs}*Qm*N_{sc\_perRB}$ is the number of bits carried in a resource block; $N_{symbs}$ is the number of OFDM symbols per slot used for data after accounting for symbols used for signaling, such as PDCCH, and Demodulation Reference Signal (DMRS) of PDSCH (e.g. for PDCCH uses 2 symbols and PDSCH DMRS uses 2 symbols, $N_{symbs}$=14−2−2=10 symbols left to carry encoded data). Further, Qm denotes the modulation order, where Qm=2 for QPSK. $N_{sc\_perRB}$=12 represents the number of sub-carriers per RB.

As seen from Equation (A), if code rate is kept constant, the TBS is roughly proportional to $Num_{RB}$. Thus, if bandwidth is higher, $Num_{RB}$ can be increased to accommodate a larger TBS. A larger TBS means a larger SIBx message size for SIBx (x=7, 8, 11, 12), meaning fewer segments and faster transmissions of the actual PWS alert message since:

$$Frags\_req \propto (Alert\_size/SIBx\_seg\_size)$$

where SIBx_seg_size=P bytes is the SIBx (x=7, 8, 11, or 12) message size; Alert_size is the size of the PWS alert message (in bytes) from AMF 112B; and "∝" indicates proportionality relation.

As an example, assuming TBS=150 bytes (1200 bits), Code Rate=679/1024=0.66, corresponding to $I_{MCS}$=9 of Table 4 (5G) below, for $Q_m$=2 and $N_{symbs}$=10, plugging into Equation (A) above we get $Num_{RB}$=8. Note that for better reliability we can use a lower coding rate, but at the cost of increased $Num_{RB}$.

For a larger channel BW, the number of PRBs available for SIB transmission may be higher. However, the physical layer imposes a limit to the maximum size a SIB can take which is 217 bytes (for DCI format 1C) and 277 bytes (for DCI format 1A) for 4G/LTE and 372 bytes for 5G (see 3GPP TS 36.331 for LTE and 3GPP TS 38.331 for 5G NR). Hence this also puts a cap on the maximum number of PRBs that can be allocated for SIB transmission.

Table 4 shows the coding rate supported for each given Modulation Order value Qm. The controller chooses a coding rate for SIBx transmission such that UEs at cell edge are able to receive the SIBx message successfully. For example, a lower coding rate corresponding to Qm=2 should be use for a cell deployment with a reference signal strength of −110 dBm at cell edge than a cell deployment with a reference signal strength of −95 dBm at the cell edge.

TABLE 4

MCS Index Table 1 for PDSCH (Table 5.1.3.1-2 in 3GPP TS 38.214 version 16.2.0 Release 16)

| MCS Index $I_{MCS}$ | Modulation Order $Q_m$ | Target code Rate × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

Segmentation of SIBx Messages

Figure 3A:
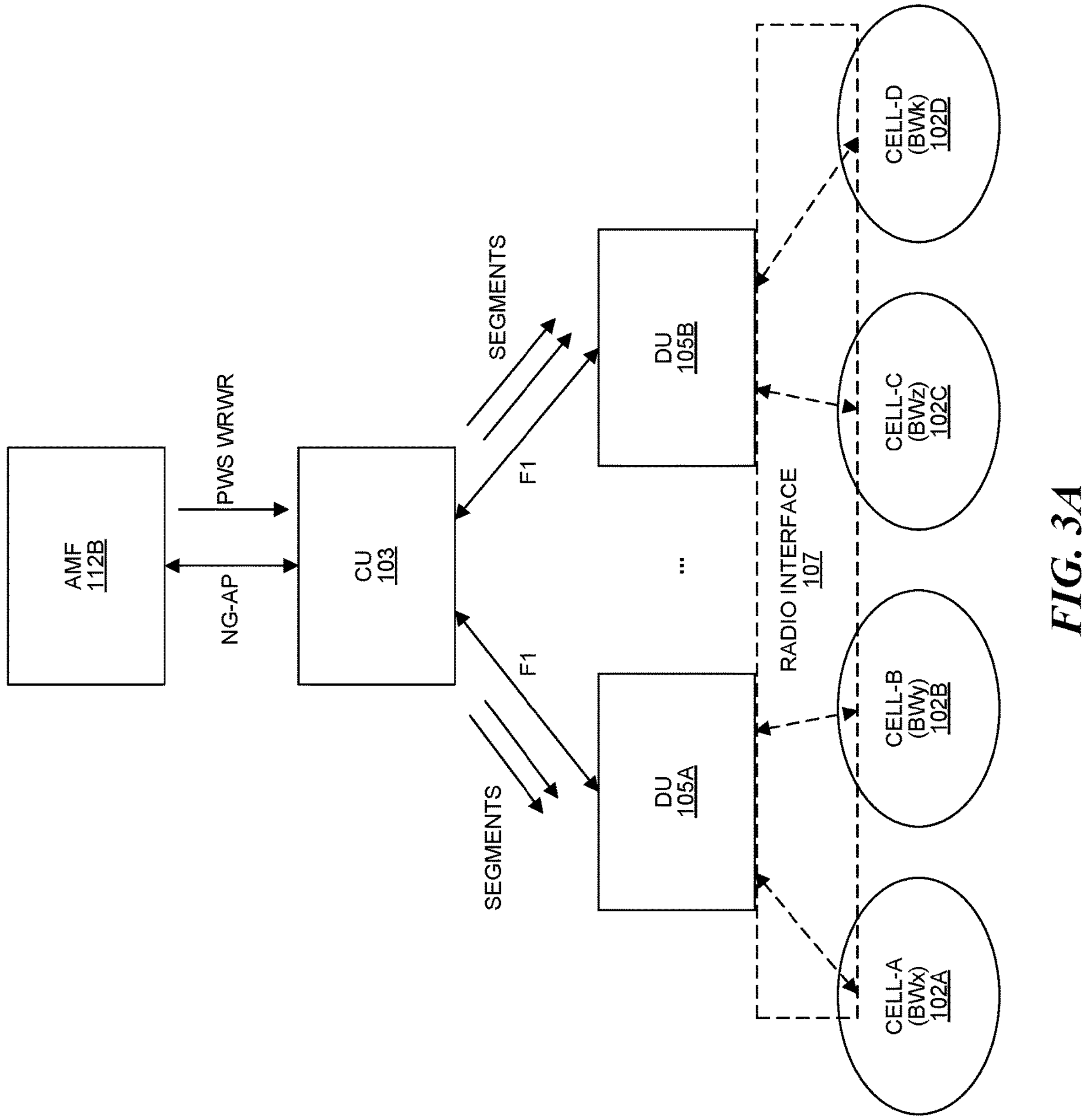
FIG. 3A is a block diagram illustrating PWS segmentation at a CU.

FIG. 3A is a block diagram illustrating PWS segmentation at a CU 103. Specifically, an alert message from the AMF 112B may be transmitted to DUs' cells 102A-D via the CU 103. The alert message from the AMF 112B may be a Write-Replace Warning Request (WRWR) message. The CU 103 may segment the PWS WRWR into SIBx messages based on cell 102 bandwidth. It should be noted that the system of FIG. 3A may send SIBx messages over the radio interface 107 using geographically-separated RUs 106 even though they are not shown in FIG. 3A.

When segmentation is done at the CU 103 (as in FIG. 3A), the CU 103 is able to: (1) segment a WRWR (Write-Replace Warning Request) message once for all cells 102 managed by the CU 103—in this case the same number of SIBx messages will be sent all DUs; 2) segment a WRWR message once for each DU 105. In this case, the number of SIBx messages maybe different per DU 105; or 3) segment a WRWR message once for each cell managed by the CU 103. The last option will be the most time-consuming at the CU 103, most inefficient usage of mid-haul bandwidth, but the most appropriate segment size for each cell bandwidth. While the first option is the easiest to implement, with least usage of mid-haul bandwidth and least delay from CU 103 to DU 105, the same segment size may not be the best when there is big discrepancy between the cell BW.

In a first configuration of segmentation at the CU 103, each DU 105 is able to send a different number of SIBx messages for different cells 102 it serves, e.g., via RUs 106 utilizing the radio interface 107. Specifically, based on the bandwidth information of the DUs' cells 102, the CU 103 can split each WRWR (Write-Replace Warning Request) message into multiple segments (SIBx messages each carrying a segment of the WRWR message) that are sent to the same DU 105, where each WRWR is targeted to a particular cell 102, and each WRWR is segmented differently when transmitted to the DUs 105A-B (the size of SIBx messages is different for different cells 102 served by a given DU 105) based on the bandwidth of each cell 102 the DU 105 serves. Thus, a different number of SIBx messages can be sent in each cell 102. In the first configuration of segmentation at the CU 103, each warning message from the CU 103 is intended for a different cell 102 or different DU-cell combination.

In a second configuration of segmentation at the CU 103, each DU 105 sends the same number of SIBx messages to each of the different cells 102 it serves, e.g., via RUs 106 utilizing the radio interface 107. Specifically, the CU 103 determines one segment size for per DU 105, which is the minimum of the determined segment sizes for the different cells 102 served by the DU 105, and issue one WRWR for the DU 105, e.g., using Equation (B) below. Therefore, in the second configuration of segmentation at the CU 103, the DU 105 uses the same segment size (SIBx message size) for all of its cells 102. This may be inefficient since the DU 105 may end up sending more segments (SIBx messages) for at least one cell 102 it serves if all cells served by the DU 105 do not have the same channel bandwidth.

In some configurations where the CU 103 performs segmentation (as in FIG. 3A), the CU 103 may include the first segment of the WRWR in a SIB message field (of the F1AP WRWR message) towards the DU, and may include any remaining segments in an Additional SIB Message List (of F1AP WRWR message) one for each segment in segmentation order to the DU.

In some configurations where the DU 105 performs segmentation (as in FIG. 3B), the CU 103 may forward the PWS alert message received from core network AMF 112B in the SIB message field (of the FLAP WRWR) to the DUs 105, at which point each DUs 105 segments the PWS WRWR into SIBx messages based on bandwidth(s) of the cell(s) 102 the DU 105 serves. When segmentation is performed at the DU 105, (1) the DU 105 can segment the WRWR once for all cells based on the smallest cell bandwidth of a cell managed by the DU 105 using Equation (B), or (2) the DU 105 can proactively use different segment sizes (SIBx message sizes) based on the individual cell 102 bandwidth and, thus, a different number of fragments may be sent in each cell 102. For example when a first DU 105A manages FDD cells of BW 10 MHz and 20 MHz, and the second DU 105B manages TDD cells of 100 MHz, it is a better choice to have segmentation at each DU 105, at a DU 105 level.

Figure 3B:
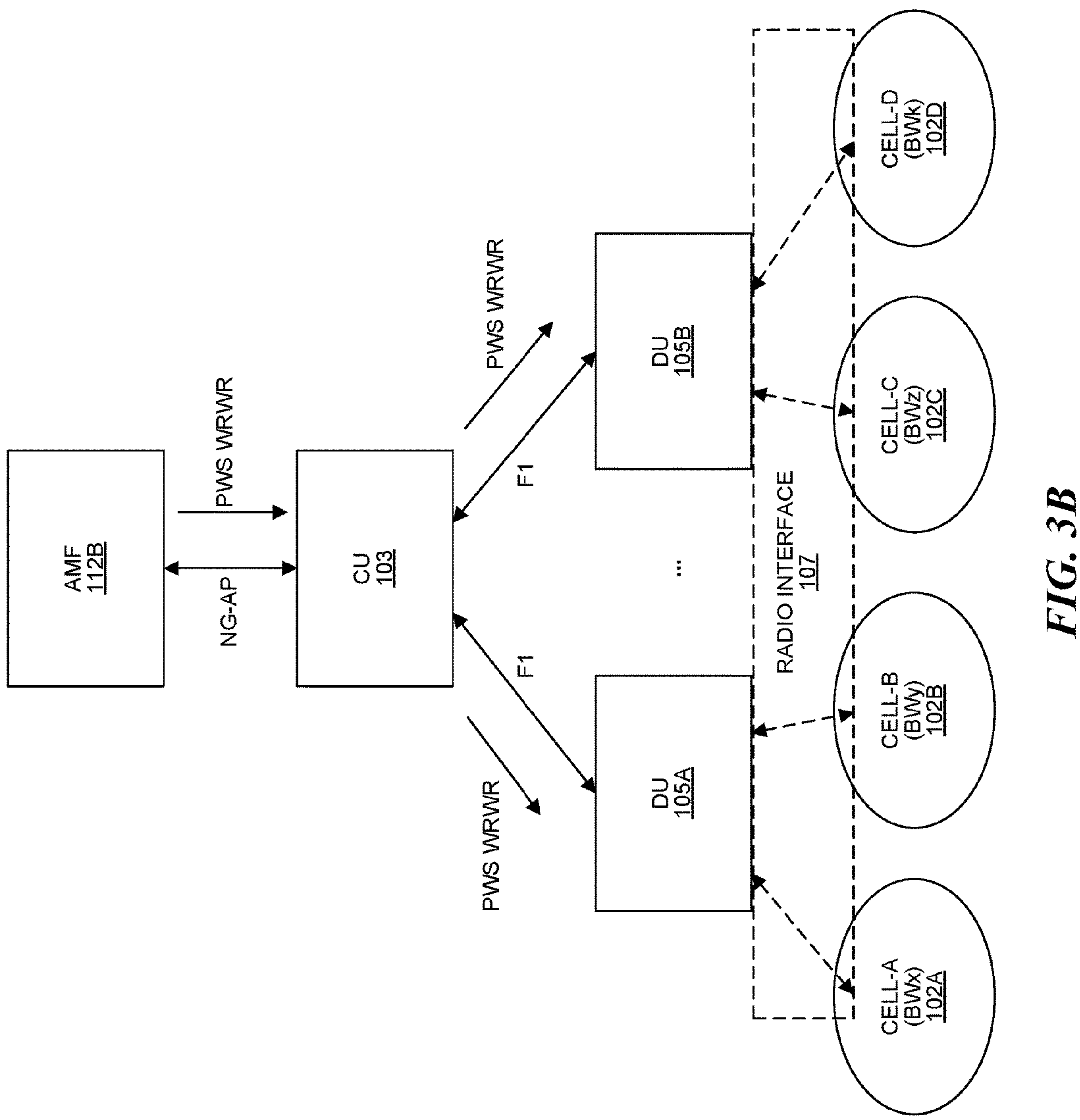
FIG. 3B is a block diagram illustrating PWS segmentation at DU(s)

It should be noted that the system of FIG. 3A, 3B may send SIBx messages over the radio interface 107 using geographically-separated RUs 106 even though they are not shown in FIG. 3B.

Determining Actual SIBx Message Size

The number of PRBs used for SIBx messages may be determined after discounting the reserved PRBs for DL voice traffic (numReservedPRB) at the slot where SIBx is transmitted. Hence, the available PRBs for SIBx would be given by Equation (B) when segmentation is done for all cells at CU 102 or DU 105, or Equation (B') when segmentation is performed for each individual cell 102:

$$numPRBSIBx=\{\min(maxPRBCell\_1, maxPRBCell\_2, \ldots maxPRBCell\_n)-numReservedPRB\} \qquad \text{Equation (B)}$$

where $maxPRBCell_i$ (i=1 to n) denotes the channel bandwidth (PRBs) of cell_i; numReservedPRB is the reserved PRBs for DL voice traffic at the slot where SIBx is transmitted for cell_i. Thus, Equation B gives the number of available PRB (numPRBSIBx) available for a SIBx message when the WRWR segmentation is done at the CU 102 or DU 105 level, where the same fragmentation is applied to all cells 102 of a CU 103 or all cells of a DU 105.

$$numPRBSIBx\_i=\{(maxPRBCell_i-numReservedPRB\_i)\} \qquad \text{Equation (B')}$$

where $maxPRBCell_i$ (i=1 to n) denotes the channel bandwidth of cell_i; numReservedPRB_i is the reserved PRBs for DL voice traffic at the slot where SIBx is transmitted for cell_i. Thus, Equation B' gives the number of PRB available for a SIBx message (numPRBSIBx_i) when the segmentation is done for cell I separately or at cell-level.

For 4G, the SIBx message size is given by Equation (C):

$$SIBx\_seg\_size=\max(\min(SIBx_{maxSize}, TBS(I_{SIBMCS}, numPRBSIBx), \text{ceiling}(\text{PWS Alert Size}/64)) \qquad \text{Equation (C)}$$

Where SIBxmaxSize is the maximum length of SIBx message supported by 3gpp as described in [0016]; the ceiling(PWS Alert Size/64) represents the minimum SIBx message size required to complete the transmission of a PWS alert in 64 or less SIBx messages. Since the maximum size of WM, WAC are 9600, 1024 bytes respectively, ceiling(PWS message size/64)<=166 bytes<=SIBxmaxSize. And $I_{SIBMCS}$ is the MCS index. Since Qm=2 is used for SIBx transmission, $I_{SIBMCS}$ is selected based on the corresponding coding rate used for SIBx message transmission, TBS is obtained from TBS look-up-tables (e.g., in 3GPP Technical Specification 36.213 v17.2) for given $I_{SIBMCS}$ and numPRBSIBx. For example, Table 5 below (table 7.1.7.2.1 of 3GPP Technical Specification 36.213 v17.2.0) may be used to look up the number of required PRBs ($N_{PRB}$) for a given TBS or vice-versa.

TABLE 5

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |
| 26A | 632 | 1288 | 1928 | 2600 | 3240 | 3880 | 4584 | 5160 | 5992 | 6456 |

| | $N_{PRB}$ | | | | | | | | | |
|---|---|---|---|---|---|---|---|---|---|---|
| $I_{TBS}$ | 11 | 12 | 13 | 14 | 15 | 16 | 17 | 18 | 19 | 20 |
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| 2 | 472 | 520 | 568 | 616 | 648 | 696 | 744 | 776 | 840 | 872 |
| 3 | 616 | 680 | 744 | 808 | 872 | 904 | 968 | 1032 | 1096 | 1160 |
| 4 | 776 | 840 | 904 | 1000 | 1064 | 1128 | 1192 | 1288 | 1352 | 1416 |
| 5 | 968 | 1032 | 1128 | 1224 | 1320 | 1384 | 1480 | 1544 | 1672 | 1736 |
| 6 | 1128 | 1224 | 1352 | 1480 | 1544 | 1672 | 1736 | 1864 | 1992 | 2088 |
| 7 | 1320 | 1480 | 1608 | 1672 | 1800 | 1928 | 2088 | 2216 | 2344 | 2472 |
| 8 | 1544 | 1672 | 1800 | 1928 | 2088 | 2216 | 2344 | 2536 | 2664 | 2792 |
| 9 | 1736 | 1864 | 2024 | 2216 | 2344 | 2536 | 2664 | 2856 | 2984 | 3112 |
| 10 | 1928 | 2088 | 2280 | 2472 | 2664 | 2792 | 2984 | 3112 | 3368 | 3496 |
| 11 | 2216 | 2408 | 2600 | 2792 | 2984 | 3240 | 3496 | 3624 | 3880 | 4008 |
| 12 | 2472 | 2728 | 2984 | 3240 | 3368 | 3624 | 3880 | 4136 | 4392 | 4584 |
| 13 | 2856 | 3112 | 3368 | 3624 | 3880 | 4136 | 4392 | 4584 | 4968 | 5160 |
| 14 | 3112 | 3496 | 3752 | 4008 | 4264 | 4584 | 4968 | 5160 | 5544 | 5736 |
| 15 | 3368 | 3624 | 4008 | 4264 | 4584 | 4968 | 5160 | 5544 | 5736 | 6200 |

TABLE 5-continued

| | | | | | | | | | | |
|---|---|---|---|---|---|---|---|---|---|---|
| 16 | 3624 | 3880 | 4264 | 4584 | 4968 | 5160 | 5544 | 5992 | 6200 | 6456 |
| 17 | 4008 | 4392 | 4776 | 5160 | 5352 | 5736 | 6200 | 6456 | 6712 | 7224 |
| 18 | 4392 | 4776 | 5160 | 5544 | 5992 | 6200 | 6712 | 7224 | 7480 | 7992 |
| 19 | 4776 | 5160 | 5544 | 5992 | 6456 | 6968 | 7224 | 7736 | 8248 | 8504 |
| 20 | 5160 | 5544 | 5992 | 6456 | 6968 | 7480 | 7992 | 8248 | 8760 | 9144 |
| 21 | 5544 | 5992 | 6456 | 6968 | 7480 | 7992 | 8504 | 9144 | 9528 | 9912 |
| 22 | 5992 | 6456 | 6968 | 7480 | 7992 | 8504 | 9144 | 9528 | 10296 | 10680 |
| 23 | 6200 | 6968 | 7480 | 7992 | 8504 | 9144 | 9912 | 10296 | 11064 | 11448 |
| 24 | 6712 | 7224 | 7992 | 8504 | 9144 | 9912 | 10296 | 11064 | 11448 | 12216 |
| 25 | 6968 | 7480 | 8248 | 8760 | 9528 | 10296 | 10680 | 11448 | 12216 | 12576 |
| 26 | 8248 | 8760 | 9528 | 10296 | 11064 | 11832 | 12576 | 13536 | 14112 | 14688 |
| 26A | 7224 | 7736 | 8504 | 9144 | 9912 | 10296 | 11064 | 11832 | 12576 | 12960 |

| | $N_{PRB}$ | | | | | | | | | |
|---|---|---|---|---|---|---|---|---|---|---|
| $I_{TBS}$ | 21 | 22 | 23 | 24 | 25 | 26 | 27 | 28 | 29 | 30 |
| 0 | 568 | 600 | 616 | 648 | 680 | 712 | 744 | 776 | 776 | 808 |
| 1 | 744 | 776 | 808 | 872 | 904 | 936 | 968 | 1000 | 1032 | 1064 |
| 2 | 936 | 968 | 1000 | 1064 | 1096 | 1160 | 1192 | 1256 | 1288 | 1320 |
| 3 | 1224 | 1256 | 1320 | 1384 | 1416 | 1480 | 1544 | 1608 | 1672 | 1736 |
| 4 | 1480 | 1544 | 1608 | 1736 | 1800 | 1864 | 1928 | 1992 | 2088 | 2152 |
| 5 | 1864 | 1928 | 2024 | 2088 | 2216 | 2280 | 2344 | 2472 | 2536 | 2664 |
| 6 | 2216 | 2280 | 2408 | 2472 | 2600 | 2728 | 2792 | 2984 | 2984 | 3112 |
| 7 | 2536 | 2664 | 2792 | 2984 | 3112 | 3240 | 3368 | 3368 | 3496 | 3624 |
| 8 | 2984 | 3112 | 3240 | 3368 | 3496 | 3624 | 3752 | 3880 | 4008 | 4264 |
| 9 | 3368 | 3496 | 3624 | 3752 | 4008 | 4136 | 4264 | 4392 | 4584 | 4776 |
| 10 | 3752 | 3880 | 4008 | 4264 | 4392 | 4584 | 4776 | 4968 | 5160 | 5352 |
| 11 | 4264 | 4392 | 4584 | 4776 | 4968 | 5352 | 5544 | 5736 | 5992 | 5992 |
| 12 | 4776 | 4968 | 5352 | 5544 | 5736 | 5992 | 6200 | 6456 | 6712 | 6712 |
| 13 | 5352 | 5736 | 5992 | 6200 | 6456 | 6712 | 6968 | 7224 | 7480 | 7736 |
| 14 | 5992 | 6200 | 6456 | 6968 | 7224 | 7480 | 7736 | 7992 | 8248 | 8504 |
| 15 | 6456 | 6712 | 6968 | 7224 | 7736 | 7992 | 8248 | 8504 | 8760 | 9144 |
| 16 | 6712 | 7224 | 7480 | 7736 | 7992 | 8504 | 8760 | 9144 | 9528 | 9912 |
| 17 | 7480 | 7992 | 8248 | 8760 | 9144 | 9528 | 9912 | 10296 | 10296 | 10680 |
| 18 | 8248 | 8760 | 9144 | 9528 | 9912 | 10296 | 10680 | 11064 | 11448 | 11832 |
| 19 | 9144 | 9528 | 9912 | 10296 | 10680 | 11064 | 11448 | 12216 | 12576 | 12960 |
| 20 | 9912 | 10296 | 10680 | 11064 | 11448 | 12216 | 12576 | 12960 | 13536 | 14112 |
| 21 | 10680 | 11064 | 11448 | 12216 | 12576 | 12960 | 13536 | 14112 | 14688 | 15264 |
| 22 | 11448 | 11832 | 12576 | 12960 | 13536 | 14112 | 14688 | 15264 | 15840 | 16416 |
| 23 | 12216 | 12576 | 12960 | 13536 | 14112 | 14688 | 15264 | 15840 | 16416 | 16992 |
| 24 | 12960 | 13536 | 14112 | 14688 | 15264 | 15840 | 16416 | 16992 | 17568 | 18336 |
| 25 | 13536 | 14112 | 14688 | 15264 | 15840 | 16416 | 16992 | 17568 | 18336 | 19080 |
| 26 | 15264 | 16416 | 16992 | 17568 | 18336 | 19080 | 19848 | 20616 | 21384 | 22152 |
| 26A | 13536 | 14112 | 15264 | 15840 | 16416 | 16992 | 17568 | 18336 | 19080 | 19848 |

| | $N_{PRB}$ | | | | | | | | | |
|---|---|---|---|---|---|---|---|---|---|---|
| $I_{TBS}$ | 31 | 32 | 33 | 34 | 35 | 36 | 37 | 38 | 39 | 40 |
| 0 | 840 | 872 | 904 | 936 | 968 | 1000 | 1032 | 1032 | 1064 | 1096 |
| 1 | 1128 | 1160 | 1192 | 1224 | 1256 | 1288 | 1352 | 1384 | 1416 | 1416 |
| 2 | 1384 | 1416 | 1480 | 1544 | 1544 | 1608 | 1672 | 1672 | 1736 | 1800 |
| 3 | 1800 | 1864 | 1928 | 1992 | 2024 | 2088 | 2152 | 2216 | 2280 | 2344 |
| 4 | 2216 | 2280 | 2344 | 2408 | 2472 | 2600 | 2664 | 2728 | 2792 | 2856 |
| 5 | 2728 | 2792 | 2856 | 2984 | 3112 | 3112 | 3240 | 3368 | 3496 | 3496 |
| 6 | 3240 | 3368 | 3496 | 3496 | 3624 | 3752 | 3880 | 4008 | 4136 | 4136 |
| 7 | 3752 | 3880 | 4008 | 4136 | 4264 | 4392 | 4584 | 4584 | 4776 | 4968 |
| 8 | 4392 | 4584 | 4584 | 4776 | 4968 | 4968 | 5160 | 5352 | 5544 | 5544 |
| 9 | 4968 | 5160 | 5160 | 5352 | 5544 | 5736 | 5736 | 5992 | 6200 | 6200 |
| 10 | 5544 | 5736 | 5736 | 5992 | 6200 | 6200 | 6456 | 6712 | 6712 | 6968 |
| 11 | 6200 | 6456 | 6712 | 6968 | 6968 | 7224 | 7480 | 7736 | 7736 | 7992 |
| 12 | 6968 | 7224 | 7480 | 7736 | 7992 | 8248 | 8504 | 8760 | 8760 | 9144 |
| 13 | 7992 | 8248 | 8504 | 8760 | 9144 | 9144 | 9528 | 9912 | 9912 | 10296 |
| 14 | 8760 | 9144 | 9528 | 9912 | 9912 | 10296 | 10680 | 11064 | 11064 | 11448 |
| 15 | 9528 | 9912 | 10296 | 10296 | 10680 | 11064 | 11448 | 11832 | 11832 | 12216 |
| 16 | 9912 | 10296 | 10680 | 11064 | 11448 | 11832 | 12216 | 12216 | 12576 | 12960 |
| 17 | 11064 | 11448 | 11832 | 12216 | 12576 | 12960 | 13536 | 13536 | 14112 | 14688 |
| 18 | 12216 | 12576 | 12960 | 13536 | 14112 | 14112 | 14688 | 15264 | 15264 | 15840 |
| 19 | 13536 | 13536 | 14112 | 14688 | 15264 | 15264 | 15840 | 16416 | 16992 | 16992 |
| 20 | 14688 | 14688 | 15264 | 15840 | 16416 | 16992 | 16992 | 17568 | 18336 | 18336 |
| 21 | 15840 | 15840 | 16416 | 16992 | 17568 | 18336 | 18336 | 19080 | 19848 | 19848 |
| 22 | 16992 | 16992 | 17568 | 18336 | 19080 | 19080 | 19848 | 20616 | 21384 | 21384 |

TABLE 5-continued

| | | | | | | | | | | |
|---|---|---|---|---|---|---|---|---|---|---|
| 23 | 17568 | 18336 | 19080 | 19848 | 19848 | 20616 | 21384 | 22152 | 22152 | 22920 |
| 24 | 19080 | 19848 | 19848 | 20616 | 21384 | 22152 | 22920 | 22920 | 23688 | 24496 |
| 25 | 19848 | 20616 | 20616 | 21384 | 22152 | 22920 | 23688 | 24496 | 24496 | 25456 |
| 26 | 22920 | 23688 | 24496 | 25456 | 25456 | 26416 | 27376 | 28336 | 29296 | 29296 |
| 26A | 20616 | 20616 | 21384 | 22152 | 22920 | 23688 | 24496 | 24496 | 25456 | 26416 |

| | $N_{PRB}$ | | | | | | | | | |
|---|---|---|---|---|---|---|---|---|---|---|
| $I_{TBS}$ | 41 | 42 | 43 | 44 | 45 | 46 | 47 | 48 | 49 | 50 |
| 0 | 1128 | 1160 | 1192 | 1224 | 1256 | 1256 | 1288 | 1320 | 1352 | 1384 |
| 1 | 1480 | 1544 | 1544 | 1608 | 1608 | 1672 | 1736 | 1736 | 1800 | 1800 |
| 2 | 1800 | 1864 | 1928 | 1992 | 2024 | 2088 | 2088 | 2152 | 2216 | 2216 |
| 3 | 2408 | 2472 | 2536 | 2536 | 2600 | 2664 | 2728 | 2792 | 2856 | 2856 |
| 4 | 2984 | 2984 | 3112 | 3112 | 3240 | 3240 | 3368 | 3496 | 3496 | 3624 |
| 5 | 3624 | 3752 | 3752 | 3880 | 4008 | 4008 | 4136 | 4264 | 4392 | 4392 |
| 6 | 4264 | 4392 | 4584 | 4584 | 4776 | 4776 | 4968 | 4968 | 5160 | 5160 |
| 7 | 4968 | 5160 | 5352 | 5352 | 5544 | 5736 | 5736 | 5992 | 5992 | 6200 |
| 8 | 5736 | 5992 | 5992 | 6200 | 6200 | 6456 | 6456 | 6712 | 6968 | 6968 |
| 9 | 6456 | 6712 | 6712 | 6968 | 6968 | 7224 | 7480 | 7480 | 7736 | 7992 |
| 10 | 7224 | 7480 | 7480 | 7736 | 7992 | 7992 | 8248 | 8504 | 8504 | 8760 |
| 11 | 8248 | 8504 | 8760 | 8760 | 9144 | 9144 | 9528 | 9528 | 9912 | 9912 |
| 12 | 9528 | 9528 | 9912 | 9912 | 10296 | 10680 | 10680 | 11064 | 11064 | 11448 |
| 13 | 10680 | 10680 | 11064 | 11448 | 11448 | 11832 | 12216 | 12216 | 12576 | 12960 |
| 14 | 11832 | 12216 | 12216 | 12576 | 12960 | 12960 | 13536 | 13536 | 14112 | 14112 |
| 15 | 12576 | 12960 | 12960 | 13536 | 13536 | 14112 | 14688 | 14688 | 15264 | 15264 |
| 16 | 13536 | 13536 | 14112 | 14112 | 14688 | 14688 | 15264 | 15840 | 15840 | 16416 |
| 17 | 14688 | 15264 | 15264 | 15840 | 16416 | 16416 | 16992 | 17568 | 17568 | 18336 |
| 18 | 16416 | 16416 | 16992 | 17568 | 17568 | 18336 | 18336 | 19080 | 19080 | 19848 |
| 19 | 17568 | 18336 | 18336 | 19080 | 19080 | 19848 | 20616 | 20616 | 21384 | 21384 |
| 20 | 19080 | 19848 | 19848 | 20616 | 20616 | 21384 | 22152 | 22152 | 22920 | 22920 |
| 21 | 20616 | 21384 | 21384 | 22152 | 22920 | 22920 | 23688 | 24496 | 24496 | 25456 |
| 22 | 22152 | 22920 | 22920 | 23688 | 24496 | 24496 | 25456 | 25456 | 26416 | 27376 |
| 23 | 23688 | 24496 | 24496 | 25456 | 25456 | 26416 | 27376 | 27376 | 28336 | 28336 |
| 24 | 25456 | 25456 | 26416 | 26416 | 27376 | 28336 | 28336 | 29296 | 29296 | 30576 |
| 25 | 26416 | 26416 | 27376 | 28336 | 28336 | 29296 | 29296 | 30576 | 31704 | 31704 |
| 26 | 30576 | 30576 | 31704 | 32856 | 32856 | 34008 | 35160 | 35160 | 36696 | 36696 |
| 26A | 26416 | 27376 | 27376 | 29296 | 29296 | 29296 | 30576 | 30576 | 31704 | 32856 |

| | $N_{PRB}$ | | | | | | | | | |
|---|---|---|---|---|---|---|---|---|---|---|
| $I_{TBS}$ | 51 | 52 | 53 | 54 | 55 | 56 | 57 | 58 | 59 | 60 |
| 0 | 1416 | 1416 | 1480 | 1480 | 1544 | 1544 | 1608 | 1608 | 1608 | 1672 |
| 1 | 1864 | 1864 | 1928 | 1992 | 1992 | 2024 | 2088 | 2088 | 2152 | 2152 |
| 2 | 2280 | 2344 | 2344 | 2408 | 2472 | 2536 | 2536 | 2600 | 2664 | 2664 |
| 3 | 2984 | 2984 | 3112 | 3112 | 3240 | 3240 | 3368 | 3368 | 3496 | 3496 |
| 4 | 3624 | 3752 | 3752 | 3880 | 4008 | 4008 | 4136 | 4136 | 4264 | 4264 |
| 5 | 4584 | 4584 | 4776 | 4776 | 4776 | 4968 | 4968 | 5160 | 5160 | 5352 |
| 6 | 5352 | 5352 | 5544 | 5736 | 5736 | 5992 | 5992 | 5992 | 6200 | 6200 |
| 7 | 6200 | 6456 | 6456 | 6712 | 6712 | 6712 | 6968 | 6968 | 7224 | 7224 |
| 8 | 7224 | 7224 | 7480 | 7480 | 7736 | 7736 | 7992 | 7992 | 8248 | 8504 |
| 9 | 7992 | 8248 | 8248 | 8504 | 8760 | 8760 | 9144 | 9144 | 9144 | 9528 |
| 10 | 9144 | 9144 | 9144 | 9528 | 9528 | 9912 | 9912 | 10296 | 10296 | 10680 |
| 11 | 10296 | 10680 | 10680 | 11064 | 11064 | 11448 | 11448 | 11832 | 11832 | 12216 |
| 12 | 11832 | 11832 | 12216 | 12216 | 12576 | 12576 | 12960 | 12960 | 13536 | 13536 |
| 13 | 12960 | 13536 | 13536 | 14112 | 14112 | 14688 | 14688 | 14688 | 15264 | 15264 |
| 14 | 14688 | 14688 | 15264 | 15264 | 15840 | 15840 | 16416 | 16416 | 16992 | 16992 |
| 15 | 15840 | 15840 | 16416 | 16416 | 16992 | 16992 | 17568 | 17568 | 18336 | 18336 |
| 16 | 16416 | 16992 | 16992 | 17568 | 17568 | 18336 | 18336 | 19080 | 19080 | 19848 |
| 17 | 18336 | 19080 | 19080 | 19848 | 19848 | 20616 | 20616 | 20616 | 21384 | 21384 |
| 18 | 19848 | 20616 | 21384 | 21384 | 22152 | 22152 | 22920 | 22920 | 23688 | 23688 |
| 19 | 22152 | 22152 | 22920 | 22920 | 23688 | 24496 | 24496 | 25456 | 25456 | 25456 |
| 20 | 23688 | 24496 | 24496 | 25456 | 25456 | 26416 | 26416 | 27376 | 27376 | 28336 |
| 21 | 25456 | 26416 | 26416 | 27376 | 27376 | 28336 | 28336 | 29296 | 29296 | 30576 |
| 22 | 27376 | 28336 | 28336 | 29296 | 29296 | 30576 | 30576 | 31704 | 31704 | 32856 |
| 23 | 29296 | 29296 | 30576 | 30576 | 31704 | 31704 | 32856 | 32856 | 34008 | 34008 |
| 24 | 31704 | 31704 | 32856 | 32856 | 34008 | 34008 | 35160 | 35160 | 36696 | 36696 |
| 25 | 32856 | 32856 | 34008 | 34008 | 35160 | 35160 | 36696 | 36696 | 37888 | 37888 |
| 26 | 37888 | 37888 | 39232 | 40576 | 40576 | 40576 | 42368 | 42368 | 43816 | 43816 |
| 26A | 32856 | 34008 | 34008 | 35160 | 36696 | 36696 | 36696 | 37888 | 37888 | 39232 |

| | $N_{PRB}$ | | | | | | | | | |
|---|---|---|---|---|---|---|---|---|---|---|
| $I_{TBS}$ | 61 | 62 | 63 | 64 | 65 | 66 | 67 | 68 | 69 | 70 |
| 0 | 1672 | 1736 | 1736 | 1800 | 1800 | 1800 | 1864 | 1864 | 1928 | 1928 |
| 1 | 2216 | 2280 | 2280 | 2344 | 2344 | 2408 | 2472 | 2472 | 2536 | 2536 |
| 2 | 2728 | 2792 | 2856 | 2856 | 2856 | 2984 | 2984 | 3112 | 3112 | 3112 |
| 3 | 3624 | 3624 | 3624 | 3752 | 3752 | 3880 | 3880 | 4008 | 4008 | 4136 |

TABLE 5-continued

| | | | | | | | | | | |
|---|---|---|---|---|---|---|---|---|---|---|
| 4 | 4392 | 4392 | 4584 | 4584 | 4584 | 4776 | 4776 | 4968 | 4968 | 4968 |
| 5 | 5352 | 5544 | 5544 | 5736 | 5736 | 5736 | 5992 | 5992 | 5992 | 6200 |
| 6 | 6456 | 6456 | 6456 | 6712 | 6712 | 6968 | 6968 | 6968 | 7224 | 7224 |
| 7 | 7480 | 7480 | 7736 | 7736 | 7992 | 7992 | 8248 | 8248 | 8504 | 8504 |
| 8 | 8504 | 8760 | 8760 | 9144 | 9144 | 9144 | 9528 | 9528 | 9528 | 9912 |
| 9 | 9528 | 9912 | 9912 | 10296 | 10296 | 10296 | 10680 | 10680 | 11064 | 11064 |
| 10 | 10680 | 11064 | 11064 | 11448 | 11448 | 11448 | 11832 | 11832 | 12216 | 12216 |
| 11 | 12216 | 12576 | 12576 | 12960 | 12960 | 13536 | 13536 | 13536 | 14112 | 14112 |
| 12 | 14112 | 14112 | 14112 | 14688 | 14688 | 15264 | 15264 | 15264 | 15840 | 15840 |
| 13 | 15840 | 15840 | 16416 | 16416 | 16992 | 16992 | 16992 | 17568 | 17568 | 18336 |
| 14 | 17568 | 17568 | 18336 | 18336 | 18336 | 19080 | 19080 | 19848 | 19848 | 19848 |
| 15 | 18336 | 19080 | 19080 | 19848 | 19848 | 20616 | 20616 | 20616 | 21384 | 21384 |
| 16 | 19848 | 19848 | 20616 | 20616 | 21384 | 21384 | 22152 | 22152 | 22152 | 22920 |
| 17 | 22152 | 22152 | 22920 | 22920 | 23688 | 23688 | 24496 | 24496 | 24496 | 25456 |
| 18 | 24496 | 24496 | 24496 | 25456 | 25456 | 26416 | 26416 | 27376 | 27376 | 27376 |
| 19 | 26416 | 26416 | 27376 | 27376 | 28336 | 28336 | 29296 | 29296 | 29296 | 30576 |
| 20 | 28336 | 29296 | 29296 | 29296 | 30576 | 30576 | 31704 | 31704 | 31704 | 32856 |
| 21 | 30576 | 31704 | 31704 | 31704 | 32856 | 32856 | 34008 | 34008 | 35160 | 35160 |
| 22 | 32856 | 34008 | 34008 | 34008 | 35160 | 35160 | 36696 | 36696 | 36696 | 37888 |
| 23 | 35160 | 35160 | 36696 | 36696 | 37888 | 37888 | 37888 | 39232 | 39232 | 40576 |
| 24 | 36696 | 37888 | 37888 | 39232 | 39232 | 40576 | 40576 | 42368 | 42368 | 42368 |
| 25 | 39232 | 39232 | 40576 | 40576 | 40576 | 42368 | 42368 | 43816 | 43816 | 43816 |
| 26 | 45352 | 45352 | 46888 | 46888 | 48936 | 48936 | 48936 | 51024 | 51024 | 52752 |
| 26A | 40576 | 40576 | 40576 | 40576 | 42368 | 42368 | 43816 | 43816 | 45352 | 45352 |

| | $N_{PRB}$ | | | | | | | | | |
|---|---|---|---|---|---|---|---|---|---|---|
| $I_{TBS}$ | 71 | 72 | 73 | 74 | 75 | 76 | 77 | 78 | 79 | 80 |
| 0 | 1992 | 1992 | 2024 | 2088 | 2088 | 2088 | 2152 | 2152 | 2216 | 2216 |
| 1 | 2600 | 2600 | 2664 | 2728 | 2728 | 2792 | 2792 | 2856 | 2856 | 2856 |
| 2 | 3240 | 3240 | 3240 | 3368 | 3368 | 3368 | 3496 | 3496 | 3496 | 3624 |
| 3 | 4136 | 4264 | 4264 | 4392 | 4392 | 4392 | 4584 | 4584 | 4584 | 4776 |
| 4 | 5160 | 5160 | 5160 | 5352 | 5352 | 5544 | 5544 | 5544 | 5736 | 5736 |
| 5 | 6200 | 6200 | 6456 | 6456 | 6712 | 6712 | 6712 | 6968 | 6968 | 6968 |
| 6 | 7480 | 7480 | 7736 | 7736 | 7736 | 7992 | 7992 | 8248 | 8248 | 8248 |
| 7 | 8760 | 8760 | 8760 | 9144 | 9144 | 9144 | 9528 | 9528 | 9528 | 9912 |
| 8 | 9912 | 9912 | 10296 | 10296 | 10680 | 10680 | 10680 | 11064 | 11064 | 11064 |
| 9 | 11064 | 11448 | 11448 | 11832 | 11832 | 11832 | 12216 | 12216 | 12576 | 12576 |
| 10 | 12576 | 12576 | 12960 | 12960 | 12960 | 13536 | 13536 | 13536 | 14112 | 14112 |
| 11 | 14112 | 14688 | 14688 | 14688 | 15264 | 15264 | 15840 | 15840 | 15840 | 16416 |
| 12 | 16416 | 16416 | 16416 | 16992 | 16992 | 17568 | 17568 | 17568 | 18336 | 18336 |
| 13 | 18336 | 18336 | 19080 | 19080 | 19080 | 19848 | 19848 | 19848 | 20616 | 20616 |
| 14 | 20616 | 20616 | 20616 | 21384 | 21384 | 22152 | 22152 | 22152 | 22920 | 22920 |
| 15 | 22152 | 22152 | 22152 | 22920 | 22920 | 23688 | 23688 | 23688 | 24496 | 24496 |
| 16 | 22920 | 23688 | 23688 | 24496 | 24496 | 24496 | 25456 | 25456 | 25456 | 26416 |
| 17 | 25456 | 26416 | 26416 | 26416 | 27376 | 27376 | 27376 | 28336 | 28336 | 29296 |
| 18 | 28336 | 28336 | 29296 | 29296 | 29296 | 30576 | 30576 | 30576 | 31704 | 31704 |
| 19 | 30576 | 30576 | 31704 | 31704 | 32856 | 32856 | 32856 | 34008 | 34008 | 34008 |
| 20 | 32856 | 34008 | 34008 | 34008 | 35160 | 35160 | 35160 | 36696 | 36696 | 36696 |
| 21 | 35160 | 36696 | 36696 | 36696 | 37888 | 37888 | 39232 | 39232 | 39232 | 40576 |
| 22 | 37888 | 39232 | 39232 | 40576 | 40576 | 40576 | 42368 | 42368 | 42368 | 43816 |
| 23 | 40576 | 40576 | 42368 | 42368 | 43816 | 43816 | 43816 | 45352 | 45352 | 45352 |
| 24 | 43816 | 43816 | 45352 | 45352 | 45352 | 46888 | 46888 | 46888 | 48936 | 48936 |
| 25 | 45352 | 45352 | 46888 | 46888 | 46888 | 48936 | 48936 | 48936 | 51024 | 51024 |
| 26 | 52752 | 52752 | 55056 | 55056 | 55056 | 55056 | 57336 | 57336 | 57336 | 59256 |
| 26A | 45352 | 46888 | 46888 | 48936 | 48936 | 48936 | 51024 | 51024 | 51024 | 52752 |

| | $N_{PRB}$ | | | | | | | | | |
|---|---|---|---|---|---|---|---|---|---|---|
| $I_{TBS}$ | 81 | 82 | 83 | 84 | 85 | 86 | 87 | 88 | 89 | 90 |
| 0 | 2280 | 2280 | 2280 | 2344 | 2344 | 2408 | 2408 | 2472 | 2472 | 2536 |
| 1 | 2984 | 2984 | 2984 | 3112 | 3112 | 3112 | 3240 | 3240 | 3240 | 3240 |
| 2 | 3624 | 3624 | 3752 | 3752 | 3880 | 3880 | 3880 | 4008 | 4008 | 4008 |
| 3 | 4776 | 4776 | 4776 | 4968 | 4968 | 4968 | 5160 | 5160 | 5160 | 5352 |
| 4 | 5736 | 5992 | 5992 | 5992 | 5992 | 6200 | 6200 | 6200 | 6456 | 6456 |
| 5 | 7224 | 7224 | 7224 | 7480 | 7480 | 7480 | 7736 | 7736 | 7736 | 7992 |
| 6 | 8504 | 8504 | 8760 | 8760 | 8760 | 9144 | 9144 | 9144 | 9144 | 9528 |
| 7 | 9912 | 9912 | 10296 | 10296 | 10296 | 10680 | 10680 | 10680 | 11064 | 11064 |
| 8 | 11448 | 11448 | 11448 | 11832 | 11832 | 12216 | 12216 | 12216 | 12576 | 12576 |
| 9 | 12960 | 12960 | 12960 | 13536 | 13536 | 13536 | 13536 | 14112 | 14112 | 14112 |
| 10 | 14112 | 14688 | 14688 | 14688 | 14688 | 15264 | 15264 | 15264 | 15840 | 15840 |
| 11 | 16416 | 16416 | 16992 | 16992 | 16992 | 17568 | 17568 | 17568 | 18336 | 18336 |
| 12 | 18336 | 19080 | 19080 | 19080 | 19080 | 19848 | 19848 | 19848 | 20616 | 20616 |
| 13 | 20616 | 21384 | 21384 | 21384 | 22152 | 22152 | 22152 | 22920 | 22920 | 22920 |
| 14 | 22920 | 23688 | 23688 | 24496 | 24496 | 24496 | 25456 | 25456 | 25456 | 25456 |
| 15 | 24496 | 25456 | 25456 | 25456 | 26416 | 26416 | 26416 | 27376 | 27376 | 27376 |
| 16 | 26416 | 26416 | 27376 | 27376 | 27376 | 28336 | 28336 | 28336 | 29296 | 29296 |
| 17 | 29296 | 29296 | 30576 | 30576 | 30576 | 30576 | 31704 | 31704 | 31704 | 32856 |

TABLE 5-continued

| | | | | | | | | | | |
|---|---|---|---|---|---|---|---|---|---|---|
| 18 | 31704 | 32856 | 32856 | 32856 | 34008 | 34008 | 34008 | 35160 | 35160 | 35160 |
| 19 | 35160 | 35160 | 35160 | 36696 | 36696 | 36696 | 37888 | 37888 | 37888 | 39232 |
| 20 | 37888 | 37888 | 39232 | 39232 | 39232 | 40576 | 40576 | 40576 | 42368 | 42368 |
| 21 | 40576 | 40576 | 42368 | 42368 | 42368 | 43816 | 43816 | 43816 | 45352 | 45352 |
| 22 | 43816 | 43816 | 45352 | 45352 | 45352 | 46888 | 46888 | 46888 | 48936 | 48936 |
| 23 | 46888 | 46888 | 46888 | 48936 | 48936 | 48936 | 51024 | 51024 | 51024 | 51024 |
| 24 | 48936 | 51024 | 51024 | 51024 | 52752 | 52752 | 52752 | 52752 | 55056 | 55056 |
| 25 | 51024 | 52752 | 52752 | 52752 | 55056 | 55056 | 55056 | 55056 | 57336 | 57336 |
| 26 | 59256 | 59256 | 61664 | 61664 | 61664 | 63776 | 63776 | 63776 | 66592 | 66592 |
| 26A | 52752 | 52752 | 55056 | 55056 | 55056 | 55056 | 57336 | 57336 | 57336 | 59256 |

| | $N_{PRB}$ | | | | | | | | | |
|---|---|---|---|---|---|---|---|---|---|---|
| $I_{TBS}$ | 91 | 92 | 93 | 94 | 95 | 96 | 97 | 98 | 99 | 100 |
| 0 | 2536 | 2536 | 2600 | 2600 | 2664 | 2664 | 2728 | 2728 | 2728 | 2792 |
| 1 | 3368 | 3368 | 3368 | 3496 | 3496 | 3496 | 3496 | 3624 | 3624 | 3624 |
| 2 | 4136 | 4136 | 4136 | 4264 | 4264 | 4264 | 4392 | 4392 | 4392 | 4584 |
| 3 | 5352 | 5352 | 5352 | 5544 | 5544 | 5544 | 5736 | 5736 | 5736 | 5736 |
| 4 | 6456 | 6456 | 6712 | 6712 | 6712 | 6968 | 6968 | 6968 | 6968 | 7224 |
| 5 | 7992 | 7992 | 8248 | 8248 | 8248 | 8504 | 8504 | 8760 | 8760 | 8760 |
| 6 | 9528 | 9528 | 9528 | 9912 | 9912 | 9912 | 10296 | 10296 | 10296 | 10296 |
| 7 | 11064 | 11448 | 11448 | 11448 | 11448 | 11832 | 11832 | 11832 | 12216 | 12216 |
| 8 | 12576 | 12960 | 12960 | 12960 | 13536 | 13536 | 13536 | 13536 | 14112 | 14112 |
| 9 | 14112 | 14688 | 14688 | 14688 | 15264 | 15264 | 15264 | 15264 | 15840 | 15840 |
| 10 | 15840 | 16416 | 16416 | 16416 | 16992 | 16992 | 16992 | 16992 | 17568 | 17568 |
| 11 | 18336 | 18336 | 19080 | 19080 | 19080 | 19080 | 19848 | 19848 | 19848 | 19848 |
| 12 | 20616 | 21384 | 21384 | 21384 | 21384 | 22152 | 22152 | 22152 | 22920 | 22920 |
| 13 | 23688 | 23688 | 23688 | 24496 | 24496 | 24496 | 25456 | 25456 | 25456 | 25456 |
| 14 | 26416 | 26416 | 26416 | 27376 | 27376 | 27376 | 28336 | 28336 | 28336 | 28336 |
| 15 | 28336 | 28336 | 28336 | 29296 | 29296 | 29296 | 29296 | 30576 | 30576 | 30576 |
| 16 | 29296 | 30576 | 30576 | 30576 | 30576 | 31704 | 31704 | 31704 | 31704 | 32856 |
| 17 | 32856 | 32856 | 34008 | 34008 | 34008 | 35160 | 35160 | 35160 | 35160 | 36696 |
| 18 | 36696 | 36696 | 36696 | 37888 | 37888 | 37888 | 37888 | 39232 | 39232 | 39232 |
| 19 | 39232 | 39232 | 40576 | 40576 | 40576 | 40576 | 42368 | 42368 | 42368 | 43816 |
| 20 | 42368 | 42368 | 43816 | 43816 | 43816 | 45352 | 45352 | 45352 | 46888 | 46888 |
| 21 | 45352 | 46888 | 46888 | 46888 | 46888 | 48936 | 48936 | 48936 | 48936 | 51024 |
| 22 | 48936 | 48936 | 51024 | 51024 | 51024 | 51024 | 52752 | 52752 | 52752 | 55056 |
| 23 | 52752 | 52752 | 52752 | 55056 | 55056 | 55056 | 55056 | 57336 | 57336 | 57336 |
| 24 | 55056 | 57336 | 57336 | 57336 | 57336 | 59256 | 59256 | 59256 | 61664 | 61664 |
| 25 | 57336 | 59256 | 59256 | 59256 | 61664 | 61664 | 61664 | 61664 | 63776 | 63776 |
| 26 | 66592 | 68808 | 68808 | 68808 | 71112 | 71112 | 71112 | 73712 | 73712 | 75376 |
| 26A | 59256 | 59256 | 59256 | 61664 | 61664 | 61664 | 63776 | 63776 | 63776 | 66592 |

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 0 | 2792 | 2856 | 2856 | 2856 | 2984 | 2984 | 2984 | 2984 | 2984 | 3112 |
| 1 | 3752 | 3752 | 3752 | 3752 | 3880 | 3880 | 3880 | 4008 | 4008 | 4008 |
| 2 | 4584 | 4584 | 4584 | 4584 | 4776 | 4776 | 4776 | 4776 | 4968 | 4968 |
| 3 | 5992 | 5992 | 5992 | 5992 | 6200 | 6200 | 6200 | 6200 | 6456 | 6456 |
| 4 | 7224 | 7224 | 7480 | 7480 | 7480 | 7480 | 7736 | 7736 | 7736 | 7992 |
| 5 | 8760 | 9144 | 9144 | 9144 | 9144 | 9528 | 9528 | 9528 | 9528 | 9528 |
| 6 | 10680 | 10680 | 10680 | 10680 | 11064 | 11064 | 11064 | 11448 | 11448 | 11448 |
| 7 | 12216 | 12576 | 12576 | 12576 | 12960 | 12960 | 12960 | 12960 | 13536 | 13536 |
| 8 | 14112 | 14112 | 14688 | 14688 | 14688 | 14688 | 15264 | 15264 | 15264 | 15264 |
| 9 | 15840 | 16416 | 16416 | 16416 | 16416 | 16992 | 16992 | 16992 | 16992 | 17568 |
| 10 | 17568 | 18336 | 18336 | 18336 | 18336 | 18336 | 19080 | 19080 | 19080 | 19080 |
| 11 | 20616 | 20616 | 20616 | 21384 | 21384 | 21384 | 21384 | 22152 | 22152 | 22152 |
| 12 | 22920 | 23688 | 23688 | 23688 | 23688 | 24496 | 24496 | 24496 | 24496 | 25456 |
| 13 | 26416 | 26416 | 26416 | 26416 | 27376 | 27376 | 27376 | 27376 | 28336 | 28336 |
| 14 | 29296 | 29296 | 29296 | 29296 | 30576 | 30576 | 30576 | 30576 | 31704 | 31704 |
| 15 | 30576 | 31704 | 31704 | 31704 | 31704 | 32856 | 32856 | 32856 | 34008 | 34008 |
| 16 | 32856 | 32856 | 34008 | 34008 | 34008 | 34008 | 35160 | 35160 | 35160 | 35160 |
| 17 | 36696 | 36696 | 36696 | 37888 | 37888 | 37888 | 39232 | 39232 | 39232 | 39232 |
| 18 | 40576 | 40576 | 40576 | 40576 | 42368 | 42368 | 42368 | 42368 | 43816 | 43816 |
| 19 | 43816 | 43816 | 43816 | 45352 | 45352 | 45352 | 46888 | 46888 | 46888 | 46888 |
| 20 | 46888 | 46888 | 48936 | 48936 | 48936 | 48936 | 48936 | 51024 | 51024 | 51024 |
| 21 | 51024 | 51024 | 51024 | 52752 | 52752 | 52752 | 52752 | 55056 | 55056 | 55056 |
| 22 | 55056 | 55056 | 55056 | 57336 | 57336 | 57336 | 57336 | 59256 | 59256 | 59256 |

TABLE 5-continued

| | | | | | | | | | | |
|---|---|---|---|---|---|---|---|---|---|---|
| 23 | 57336 | 59256 | 59256 | 59256 | 59256 | 61664 | 61664 | 61664 | 61664 | 63776 |
| 24 | 61664 | 61664 | 63776 | 63776 | 63776 | 63776 | 66592 | 66592 | 66592 | 66592 |
| 25 | 63776 | 63776 | 66592 | 66592 | 66592 | 66592 | 68808 | 68808 | 68808 | 71112 |
| 26 | 75376 | 75376 | 75376 | 75376 | 75376 | 75376 | 75376 | 75376 | 75376 | 75376 |
| 26A | 66592 | 66592 | 66592 | 68808 | 68808 | 68808 | 71112 | 71112 | 71112 | 71112 |

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 27 | 648 | 1320 | 1992 | 2664 | 3368 | 4008 | 4584 | 5352 | 5992 | 6712 |
| 28 | 680 | 1384 | 2088 | 2792 | 3496 | 4264 | 4968 | 5544 | 6200 | 6968 |
| 29 | 712 | 1480 | 2216 | 2984 | 3752 | 4392 | 5160 | 5992 | 6712 | 7480 |
| 30 | 776 | 1544 | 2344 | 3112 | 3880 | 4776 | 5544 | 6200 | 6968 | 7736 |
| 31 | 808 | 1608 | 2472 | 3240 | 4136 | 4968 | 5736 | 6456 | 7480 | 8248 |
| 32 | 840 | 1672 | 2536 | 3368 | 4264 | 5160 | 5992 | 6712 | 7736 | 8504 |
| 32A | 904 | 1864 | 2792 | 3752 | 4584 | 5544 | 6456 | 7480 | 8248 | 9144 |
| 33 | 968 | 1992 | 2984 | 4008 | 4968 | 5992 | 6968 | 7992 | 8760 | 9912 |
| 33A | 840 | 1736 | 2600 | 3496 | 4392 | 5160 | 5992 | 6968 | 7736 | 8760 |
| 33B | 968 | 1992 | 2984 | 4008 | 4968 | 5992 | 6968 | 7992 | 8760 | 9912 |
| 34 | 1032 | 2088 | 3112 | 4264 | 5160 | 6200 | 7224 | 8504 | 9528 | 10296 |
| 34A | 1064 | 2088 | 3112 | 4264 | 5352 | 6456 | 7480 | 8504 | 9528 | 10680 |
| 35 | 1096 | 2216 | 3240 | 4392 | 5544 | 6712 | 7736 | 8760 | 9912 | 11064 |
| 36 | 1160 | 2280 | 3496 | 4584 | 5736 | 6968 | 7992 | 9144 | 10296 | 11448 |
| 37A | 1192 | 2408 | 3624 | 4776 | 5992 | 7224 | 8504 | 9528 | 10680 | 11832 |
| 37 | 1224 | 2472 | 3752 | 4968 | 6200 | 7480 | 8760 | 9912 | 11064 | 12384 |

| | $N_{PRB}$ | | | | | | | | | |
|---|---|---|---|---|---|---|---|---|---|---|
| $I_{TBS}$ | 11 | 12 | 13 | 14 | 15 | 16 | 17 | 18 | 19 | 20 |
| 27 | 7224 | 7992 | 8504 | 9144 | 9912 | 10680 | 11448 | 11832 | 12576 | 12960 |
| 28 | 7736 | 8504 | 9144 | 9912 | 10680 | 11064 | 11832 | 12576 | 13536 | 14112 |
| 29 | 8248 | 8760 | 9528 | 10296 | 11064 | 11832 | 12576 | 13536 | 14112 | 14688 |
| 30 | 8504 | 9528 | 10296 | 11064 | 11832 | 12576 | 13536 | 14112 | 14688 | 15840 |
| 31 | 9144 | 9912 | 10680 | 11448 | 12216 | 12960 | 14112 | 14688 | 15840 | 16416 |
| 32 | 9528 | 10296 | 11064 | 11832 | 12960 | 13536 | 14688 | 15264 | 16416 | 16992 |
| 32A | 10296 | 11064 | 12216 | 12960 | 14112 | 14688 | 15840 | 16416 | 17568 | 18336 |
| 33 | 10680 | 11832 | 12960 | 13536 | 14688 | 15840 | 16992 | 17568 | 19080 | 19848 |
| 33A | 9528 | 10296 | 11448 | 12216 | 12960 | 14112 | 14688 | 15840 | 16416 | 17568 |
| 33B | 10680 | 11832 | 12960 | 13536 | 14688 | 15840 | 16992 | 17568 | 19080 | 19848 |
| 34 | 11448 | 12576 | 13536 | 14688 | 15840 | 16992 | 17568 | 19080 | 19848 | 20616 |
| 34A | 11448 | 12576 | 13536 | 14688 | 15840 | 16992 | 17568 | 19080 | 19848 | 21384 |
| 35 | 12216 | 12960 | 14112 | 15264 | 16416 | 17568 | 18336 | 19848 | 20616 | 22152 |
| 36 | 12576 | 13536 | 14688 | 15840 | 16992 | 18336 | 19848 | 20616 | 22152 | 22920 |
| 37A | 12960 | 14112 | 15840 | 16992 | 18336 | 19080 | 20616 | 21384 | 22920 | 23688 |
| 37 | 13536 | 14688 | 15840 | 17568 | 18336 | 19848 | 21384 | 22152 | 23688 | 24496 |

| | $N_{PRB}$ | | | | | | | | | |
|---|---|---|---|---|---|---|---|---|---|---|
| $I_{TBS}$ | 21 | 22 | 23 | 24 | 25 | 26 | 27 | 28 | 29 | 30 |
| 27 | 14112 | 14688 | 15264 | 15840 | 16416 | 16992 | 17568 | 18336 | 19080 | 19848 |
| 28 | 14688 | 15264 | 16416 | 16992 | 17568 | 18336 | 19080 | 19848 | 20616 | 21384 |
| 29 | 15840 | 16416 | 16992 | 17568 | 18336 | 19080 | 19848 | 20616 | 21384 | 22152 |
| 30 | 16416 | 16992 | 18336 | 19080 | 19848 | 20616 | 21384 | 22152 | 22920 | 23688 |
| 31 | 17568 | 18336 | 19080 | 19848 | 20616 | 21384 | 22152 | 22920 | 23688 | 24496 |
| 32 | 17568 | 19080 | 19848 | 20616 | 21384 | 22152 | 22920 | 23688 | 24496 | 25456 |
| 32A | 19848 | 20616 | 21384 | 22152 | 22920 | 24496 | 25456 | 26416 | 27376 | 27376 |
| 33 | 20616 | 21384 | 22920 | 23688 | 24496 | 25456 | 26416 | 27376 | 28336 | 29296 |
| 33A | 18336 | 19080 | 19848 | 20616 | 22152 | 22920 | 23688 | 24496 | 25456 | 26416 |
| 33B | 20616 | 21384 | 22920 | 23688 | 24496 | 25456 | 26416 | 27376 | 28336 | 29296 |
| 34 | 22152 | 22920 | 24496 | 25456 | 26416 | 27376 | 28336 | 29296 | 30576 | 31704 |
| 34A | 22152 | 22920 | 24496 | 25456 | 26416 | 27376 | 28336 | 29296 | 30576 | 31704 |
| 35 | 22920 | 24496 | 25456 | 26416 | 27376 | 28336 | 29296 | 30576 | 31704 | 32856 |
| 36 | 24496 | 25456 | 26416 | 27376 | 28336 | 29296 | 30576 | 31704 | 32856 | 34008 |
| 37A | 25456 | 26416 | 27376 | 28336 | 30576 | 31704 | 32856 | 34008 | 35160 | 36696 |
| 37 | 26416 | 27376 | 28336 | 29296 | 30576 | 31704 | 32856 | 35160 | 35160 | 36696 |

| | $N_{PRB}$ | | | | | | | | | |
|---|---|---|---|---|---|---|---|---|---|---|
| $I_{TBS}$ | 31 | 32 | 33 | 34 | 35 | 36 | 37 | 38 | 39 | 40 |
| 27 | 20616 | 21384 | 22152 | 22920 | 22920 | 23688 | 24496 | 25456 | 25456 | 26416 |
| 28 | 22152 | 22152 | 22920 | 23688 | 24496 | 25456 | 26416 | 26416 | 27376 | 28336 |
| 29 | 22920 | 23688 | 24496 | 25456 | 26416 | 26416 | 27376 | 28336 | 29296 | 29296 |
| 30 | 24496 | 25456 | 25456 | 26416 | 27376 | 28336 | 29296 | 29296 | 30576 | 31704 |
| 31 | 25456 | 26416 | 27376 | 28336 | 29296 | 29296 | 30576 | 31704 | 31704 | 32856 |
| 32 | 26416 | 27376 | 28336 | 29296 | 29296 | 30576 | 31704 | 32856 | 32856 | 34008 |
| 32A | 28336 | 29296 | 30576 | 31704 | 32856 | 32856 | 34008 | 35160 | 36696 | 36696 |

TABLE 5-continued

| | | | | | | | | | | |
|---|---|---|---|---|---|---|---|---|---|---|
| 33 | 30576 | 31704 | 32856 | 34008 | 35160 | 35160 | 36696 | 37888 | 39232 | 39232 |
| 33A | 27376 | 27376 | 29296 | 29296 | 30576 | 30576 | 31704 | 32856 | 34008 | 35160 |
| 33B | 30576 | 31704 | 32856 | 34008 | 35160 | 35160 | 36696 | 37888 | 39232 | 39232 |
| 34 | 32856 | 34008 | 35160 | 35160 | 36696 | 37888 | 39232 | 39232 | 40576 | 42368 |
| 34A | 32856 | 34008 | 35160 | 35160 | 36696 | 37888 | 39232 | 40576 | 40576 | 42368 |
| 35 | 34008 | 35160 | 36696 | 37888 | 37888 | 39232 | 40576 | 42368 | 42368 | 43816 |
| 36 | 35160 | 36696 | 37888 | 39232 | 40576 | 40576 | 42368 | 43816 | 45352 | 45352 |
| 37A | 36696 | 37888 | 39232 | 40576 | 42368 | 43816 | 43816 | 45352 | 46888 | 48936 |
| 37 | 37888 | 39232 | 40576 | 42368 | 43816 | 43816 | 45352 | 46888 | 48936 | 48936 |

| | $N_{PRB}$ | | | | | | | | | |
|---|---|---|---|---|---|---|---|---|---|---|
| $I_{TBS}$ | 41 | 42 | 43 | 44 | 45 | 46 | 47 | 48 | 49 | 50 |
| 27 | 27376 | 27376 | 28336 | 29296 | 29296 | 30576 | 31704 | 31704 | 32856 | 32856 |
| 28 | 29296 | 29296 | 30576 | 30576 | 31704 | 32856 | 32856 | 34008 | 34008 | 35160 |
| 29 | 30576 | 31704 | 31704 | 32856 | 34008 | 34008 | 35160 | 35160 | 36696 | 36696 |
| 30 | 31704 | 32856 | 34008 | 34008 | 35160 | 36696 | 36696 | 37888 | 37888 | 39232 |
| 31 | 34008 | 35160 | 35160 | 36696 | 36696 | 37888 | 39232 | 39232 | 40576 | 40576 |
| 32 | 35160 | 35160 | 36696 | 37888 | 37888 | 39232 | 40576 | 40576 | 42368 | 42368 |
| 32A | 37888 | 39232 | 40576 | 40576 | 42368 | 42368 | 43816 | 43816 | 45352 | 46888 |
| 33 | 40576 | 40576 | 42368 | 43816 | 43816 | 45352 | 46888 | 46888 | 48936 | 48936 |
| 33A | 35160 | 36696 | 36696 | 37888 | 39232 | 40576 | 40576 | 40576 | 42368 | 43816 |
| 33B | 40576 | 40576 | 42368 | 43816 | 43816 | 45352 | 46888 | 46888 | 48936 | 48936 |
| 34 | 42368 | 43816 | 45352 | 46888 | 46888 | 48936 | 48936 | 51024 | 51024 | 52752 |
| 34A | 43816 | 43816 | 45352 | 46888 | 46888 | 48936 | 48936 | 51024 | 51024 | 52752 |
| 35 | 45352 | 46888 | 46888 | 48936 | 48936 | 51024 | 51024 | 52752 | 52752 | 55056 |
| 36 | 46888 | 48936 | 48936 | 51024 | 51024 | 52752 | 55056 | 55056 | 57336 | 57336 |
| 37A | 48936 | 51024 | 51024 | 52752 | 55056 | 55056 | 57336 | 57336 | 59256 | 59256 |
| 37 | 51024 | 52752 | 52752 | 55056 | 55056 | 57336 | 57336 | 59256 | 61664 | 61664 |

| | $N_{PRB}$ | | | | | | | | | |
|---|---|---|---|---|---|---|---|---|---|---|
| $I_{TBS}$ | 51 | 52 | 53 | 54 | 55 | 56 | 57 | 58 | 59 | 60 |
| 27 | 34008 | 34008 | 35160 | 35160 | 36696 | 36696 | 37888 | 37888 | 39232 | 39232 |
| 28 | 35160 | 36696 | 36696 | 37888 | 39232 | 39232 | 40576 | 40576 | 42368 | 42368 |
| 29 | 37888 | 39232 | 39232 | 40576 | 40576 | 42368 | 42368 | 43816 | 43816 | 45352 |
| 30 | 40576 | 40576 | 42368 | 42368 | 43816 | 43816 | 45352 | 45352 | 46888 | 46888 |
| 31 | 42368 | 42368 | 43816 | 45352 | 45352 | 46888 | 46888 | 46888 | 48936 | 48936 |
| 32 | 43816 | 43816 | 45352 | 46888 | 46888 | 46888 | 48936 | 48936 | 51024 | 51024 |
| 32A | 46888 | 48936 | 48936 | 51024 | 51024 | 52752 | 52752 | 52752 | 55056 | 55056 |
| 33 | 51024 | 51024 | 52752 | 52752 | 55056 | 55056 | 57336 | 57336 | 59256 | 59256 |
| 33A | 43816 | 45352 | 45352 | 46888 | 48936 | 48936 | 48936 | 51024 | 51024 | 52752 |
| 33B | 51024 | 51024 | 52752 | 52752 | 55056 | 55056 | 57336 | 57336 | 59256 | 59256 |
| 34 | 52752 | 55056 | 55056 | 57336 | 57336 | 59256 | 59256 | 61664 | 61664 | 63776 |
| 34A | 52752 | 55056 | 55056 | 57336 | 57336 | 59256 | 59256 | 61664 | 61664 | 63776 |
| 35 | 55056 | 57336 | 57336 | 59256 | 59256 | 61664 | 61664 | 63776 | 63776 | 66592 |
| 36 | 59256 | 59256 | 61664 | 61664 | 63776 | 63776 | 66592 | 66592 | 68808 | 68808 |
| 37A | 61664 | 61664 | 63776 | 63776 | 66592 | 66592 | 68808 | 68808 | 71112 | 71112 |
| 37 | 63776 | 63776 | 66592 | 66592 | 68808 | 68808 | 71112 | 71112 | 73712 | 75376 |

| | $N_{PRB}$ | | | | | | | | | |
|---|---|---|---|---|---|---|---|---|---|---|
| $I_{TBS}$ | 61 | 62 | 63 | 64 | 65 | 66 | 67 | 68 | 69 | 70 |
| 27 | 40576 | 40576 | 42368 | 42368 | 43816 | 43816 | 43816 | 45352 | 45352 | 46888 |
| 28 | 42368 | 43816 | 43816 | 45352 | 45352 | 46888 | 46888 | 46888 | 48936 | 48936 |
| 29 | 45352 | 45352 | 46888 | 46888 | 48936 | 48936 | 48936 | 51024 | 51024 | 52752 |
| 30 | 46888 | 48936 | 48936 | 51024 | 51024 | 51024 | 52752 | 52752 | 55056 | 55056 |
| 31 | 51024 | 51024 | 52752 | 52752 | 52752 | 55056 | 55056 | 55056 | 57336 | 57336 |
| 32 | 52752 | 52752 | 52752 | 55056 | 55056 | 57336 | 57336 | 57336 | 59256 | 59256 |
| 32A | 57336 | 57336 | 59256 | 59256 | 59256 | 61664 | 61664 | 63776 | 63776 | 63776 |
| 33 | 59256 | 61664 | 61664 | 63776 | 63776 | 63776 | 66592 | 66592 | 68808 | 68808 |
| 33A | 52752 | 55056 | 55056 | 55056 | 57336 | 57336 | 57336 | 59256 | 59256 | 61664 |
| 33B | 59256 | 61664 | 61664 | 63776 | 63776 | 63776 | 66592 | 66592 | 68808 | 68808 |
| 34 | 63776 | 63776 | 66592 | 66592 | 68808 | 68808 | 71112 | 71112 | 71112 | 73712 |
| 34A | 63776 | 66592 | 66592 | 66592 | 68808 | 68808 | 71112 | 71112 | 73712 | 73712 |
| 35 | 66592 | 68808 | 68808 | 71112 | 71112 | 73712 | 73712 | 75376 | 76208 | 76208 |
| 36 | 71112 | 71112 | 73712 | 73712 | 75376 | 76208 | 76208 | 78704 | 78704 | 81176 |
| 37A | 73712 | 73712 | 75376 | 76208 | 78704 | 78704 | 81176 | 81176 | 81176 | 84760 |
| 37 | 76208 | 76208 | 78704 | 78704 | 81176 | 81176 | 81176 | 84760 | 84760 | 87936 |

| | $N_{PRB}$ | | | | | | | | | |
|---|---|---|---|---|---|---|---|---|---|---|
| $I_{TBS}$ | 71 | 72 | 73 | 74 | 75 | 76 | 77 | 78 | 79 | 80 |
| 27 | 46888 | 46888 | 48936 | 48936 | 48936 | 51024 | 51024 | 51024 | 52752 | 52752 |
| 28 | 48936 | 51024 | 51024 | 52752 | 52752 | 52752 | 55056 | 55056 | 55056 | 57336 |
| 29 | 52752 | 52752 | 55056 | 55056 | 55056 | 57336 | 57336 | 57336 | 59256 | 59256 |

TABLE 5-continued

| | | | | | | | | | | |
|---|---|---|---|---|---|---|---|---|---|---|
| 30 | 55056 | 57336 | 57336 | 57336 | 59256 | 59256 | 59256 | 61664 | 61664 | 63776 |
| 31 | 59256 | 59256 | 59256 | 61664 | 61664 | 63776 | 63776 | 63776 | 66592 | 66592 |
| 32 | 61664 | 61664 | 61664 | 63776 | 63776 | 63776 | 66592 | 66592 | 66592 | 68808 |
| 32A | 66592 | 66592 | 68808 | 68808 | 68808 | 71112 | 71112 | 73712 | 73712 | 73712 |
| 33 | 71112 | 71112 | 71112 | 73712 | 75376 | 76208 | 76208 | 76208 | 78704 | 78704 |
| 33A | 61664 | 61664 | 63776 | 63776 | 66592 | 66592 | 66592 | 68808 | 68808 | 68808 |
| 33B | 71112 | 71112 | 71112 | 73712 | 75376 | 76208 | 76208 | 76208 | 78704 | 78704 |
| 34 | 75376 | 76208 | 76208 | 78704 | 78704 | 78704 | 81176 | 81176 | 81176 | 84760 |
| 34A | 75376 | 76208 | 76208 | 78704 | 78704 | 81176 | 81176 | 81176 | 84760 | 84760 |
| 35 | 78704 | 78704 | 81176 | 81176 | 81176 | 84760 | 84760 | 84760 | 87936 | 87936 |
| 36 | 81176 | 81176 | 84760 | 84760 | 84760 | 87936 | 87936 | 90816 | 90816 | 90816 |
| 37A | 84760 | 84760 | 87936 | 87936 | 90816 | 90816 | 90816 | 93800 | 93800 | 97896 |
| 37 | 87936 | 87936 | 90816 | 90816 | 93800 | 93800 | 93800 | 97896 | 97896 | 97896 |

| | $N_{PRB}$ | | | | | | | | | |
|---|---|---|---|---|---|---|---|---|---|---|
| $I_{TBS}$ | 81 | 82 | 83 | 84 | 85 | 86 | 87 | 88 | 89 | 90 |
| 27 | 52752 | 55056 | 55056 | 55056 | 57336 | 57336 | 57336 | 59256 | 59256 | 59256 |
| 28 | 57336 | 57336 | 59256 | 59256 | 59256 | 61664 | 61664 | 61664 | 61664 | 63776 |
| 29 | 59256 | 61664 | 61664 | 61664 | 63776 | 63776 | 63776 | 66592 | 66592 | 66592 |
| 30 | 63776 | 63776 | 63776 | 66592 | 66592 | 66592 | 68808 | 68808 | 68808 | 71112 |
| 31 | 66592 | 68808 | 68808 | 68808 | 71112 | 71112 | 71112 | 73712 | 73712 | 73712 |
| 32 | 68808 | 71112 | 71112 | 71112 | 73712 | 73712 | 73712 | 75376 | 76208 | 76208 |
| 32A | 75376 | 76208 | 76208 | 78704 | 78704 | 78704 | 81176 | 81176 | 81176 | 84760 |
| 33 | 81176 | 81176 | 81176 | 81176 | 84760 | 84760 | 84760 | 87936 | 87936 | 87936 |
| 33A | 71112 | 71112 | 71112 | 73712 | 75376 | 75376 | 76208 | 76208 | 78704 | 78704 |
| 33B | 81176 | 81176 | 81176 | 81176 | 84760 | 84760 | 84760 | 87936 | 87936 | 87936 |
| 34 | 84760 | 84760 | 87936 | 87936 | 87936 | 90816 | 90816 | 93800 | 93800 | 93800 |
| 34A | 84760 | 87936 | 87936 | 87936 | 90816 | 90816 | 90816 | 93800 | 93800 | 93800 |
| 35 | 87936 | 90816 | 90816 | 93800 | 93800 | 93800 | 93800 | 97896 | 97896 | 97896 |
| 36 | 93800 | 93800 | 93800 | 97896 | 97896 | 97896 | 101840 | 101840 | 101840 | 101840 |
| 37A | 97896 | 97896 | 97896 | 101840 | 101840 | 101840 | 105528 | 105528 | 105528 | 107832 |
| 37 | 101840 | 101840 | 101840 | 105528 | 105528 | 107832 | 107832 | 110136 | 110136 | 112608 |

| | $I_{TBS}$ $N_{PRB}$ | | | | | | | | | |
|---|---|---|---|---|---|---|---|---|---|---|
| $I_{TBS}$ | 91 | 92 | 93 | 94 | 95 | 96 | 97 | 98 | 99 | 100 |
| 27 | 59256 | 61664 | 61664 | 61664 | 63776 | 63776 | 63776 | 63776 | 66592 | 66592 |
| 28 | 63776 | 63776 | 66592 | 66592 | 66592 | 66592 | 68808 | 68808 | 68808 | 71112 |
| 29 | 66592 | 68808 | 68808 | 68808 | 71112 | 71112 | 71112 | 73712 | 73712 | 73712 |
| 30 | 71112 | 71112 | 73712 | 73712 | 75376 | 75376 | 76208 | 76208 | 78704 | 78704 |
| 31 | 75376 | 76208 | 76208 | 78704 | 78704 | 78704 | 81176 | 81176 | 81176 | 81176 |
| 32 | 78704 | 78704 | 78704 | 81176 | 81176 | 81176 | 84760 | 84760 | 84760 | 84760 |
| 32A | 84760 | 84760 | 87936 | 87936 | 87936 | 87936 | 90816 | 90816 | 90816 | 93800 |
| 33 | 90816 | 90816 | 90816 | 93800 | 93800 | 93800 | 93800 | 97896 | 97896 | 97896 |
| 33A | 78704 | 81176 | 81176 | 81176 | 81176 | 84760 | 84760 | 84760 | 84760 | 87936 |
| 33B | 90816 | 90816 | 90816 | 93800 | 93800 | 93800 | 93800 | 97896 | 97896 | 100752 |
| 34 | 93800 | 97896 | 97896 | 97896 | 97896 | 101840 | 101840 | 101840 | 105528 | 105528 |
| 34A | 93800 | 97896 | 97896 | 97896 | 101840 | 101840 | 101840 | 101840 | 105528 | 105528 |
| 35 | 97896 | 101840 | 101840 | 101840 | 105528 | 105528 | 105528 | 107832 | 110136 | 110136 |
| 36 | 105528 | 105528 | 107832 | 107832 | 110136 | 110136 | 112608 | 112608 | 115040 | 115040 |
| 37A | 110136 | 110136 | 112608 | 112608 | 115040 | 115040 | 117256 | 117256 | 119816 | 119816 |
| 37 | 112608 | 115040 | 115040 | 115040 | 117256 | 119816 | 119816 | 119816 | 124464 | 125808 |

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 27 | 66592 | 66592 | 68808 | 68808 | 68808 | 71112 | 71112 | 71112 | 71112 | 73712 |
| 28 | 71112 | 71112 | 73712 | 73712 | 73712 | 75376 | 75376 | 76208 | 76208 | 76208 |
| 29 | 75376 | 76208 | 76208 | 76208 | 78704 | 78704 | 78704 | 81176 | 81176 | 81176 |
| 30 | 78704 | 81176 | 81176 | 81176 | 81176 | 84760 | 84760 | 84760 | 84760 | 87936 |
| 31 | 84760 | 84760 | 84760 | 84760 | 87936 | 87936 | 87936 | 87936 | 90816 | 90816 |
| 32 | 87936 | 87936 | 87936 | 87936 | 90816 | 90816 | 90816 | 93800 | 93800 | 93800 |
| 32A | 93800 | 93800 | 93800 | 97896 | 97896 | 97896 | 97896 | 101840 | 101840 | 101840 |
| 33 | 97896 | 97896 | 97896 | 97896 | 97896 | 97896 | 97896 | 97896 | 97896 | 97896 |
| 33A | 87936 | 87936 | 87936 | 90816 | 90816 | 90816 | 93800 | 93800 | 93800 | 97896 |
| 33B | 100752 | 100752 | 100752 | 100752 | 100752 | 100752 | 100752 | 100752 | 100752 | 100752 |
| 34 | 105528 | 105528 | 105528 | 105528 | 105528 | 105528 | 105528 | 105528 | 105528 | 105528 |
| 34A | 105528 | 107832 | 107832 | 110136 | 110136 | 112608 | 112608 | 115040 | 115040 | 115040 |
| 35 | 110136 | 110136 | 112608 | 115040 | 115040 | 115040 | 117256 | 119816 | 119816 | 119816 |
| 36 | 117256 | 117256 | 117256 | 119816 | 119816 | 119816 | 124464 | 124464 | 125808 | 125808 |
| 37A | 119816 | 124464 | 124464 | 124464 | 125808 | 125808 | 128496 | 128496 | 130392 | 130392 |
| 37 | 125808 | 125808 | 128496 | 128496 | 128496 | 133208 | 133208 | 133208 | 133208 | 137792 |

For 5G, the SIBx message size can be determined from Equation (D):

$$SIBx\_seg\_size=\max(\min(SIBx_{maxSize}, N_{RE}\cdot R\cdot Q_m\cdot \upsilon), \text{ceiling}(\text{PWS Alert Size}/64)) \quad \text{Equation (D)}$$

where the parameters in Equation (E) are as follows: $\upsilon$ (number of streams or layers)=1 (because a single layer is always used for PWS transmissions); R is the coding rate selected for SIBx transmission; Qm=2 corresponding to QPSK used for SIBx message modulation; and N_RE=12*$N_{symbs}$*numPRBSIBx.

As mentioned before, in Equation (B), the minimum operation on PRB BW is done for the cells 102 based on where the segmentation of the alert message happens, CU 103 or DU(s) 105. If segmentation is at CU 103, then the cells 102 under all the DU(s) 105 are considered for this operation. Otherwise if segmentation is at the DU(s) 105, then each DU 105 performs this operation for all the cells 102 under it.

Figure 4:
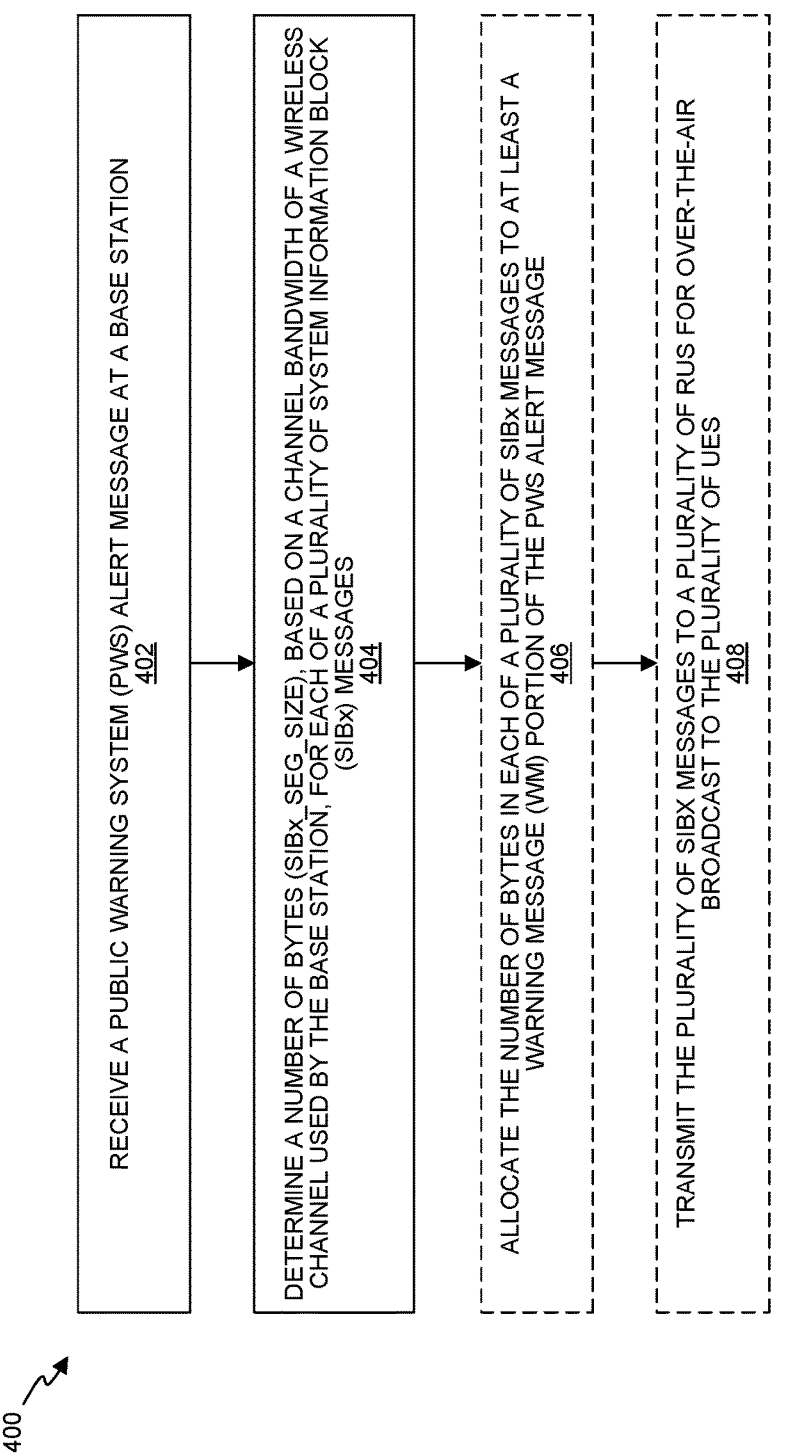
FIG. 4 is a flow diagram illustrating a method for determining the size of System Information Block (SIB) messages in a base station.

FIG. 4 is a flow diagram illustrating a method 400 for determining the size of System Information Block (SIB) messages in a base station 100A-B. The method 400 may be performed by at least a controller (e.g., a CU 103 and/or DU(s) 105, and/or a baseband controller 104) of a base station, e.g., a 4G eNB, such as a C-RAN 100A, or a 5G gNB, such as a C-RAN 100B. The controller(s) may include a respective at least one processor executing instructions stored in memory.

The blocks of the flow diagram shown in FIG. 4 have been arranged in a generally sequential manner for ease of explanation; however, it is to be understood that this arrangement is merely exemplary, and it should be recognized that the processing associated with method 400 (and the blocks shown in FIG. 4) can occur in a different order (for example, where at least some of the processing associated with the blocks is performed in parallel and/or in an event-driven manner). Also, most standard exception handling is not described for ease of explanation; however, it is to be understood that method 400 can and typically would include such exception handling.

An eNB (4G) 100A or a gNB (5G) 100B can host multiple cells where the bandwidth utilized can vary from cell 102 to cell 102. For example, 4G systems are bandwidth-limited with channel bandwidths from 5-20 MHz so there is not much room to dynamically increase or decrease the size of the SIBx messages themselves. 5G systems have more flexibility with channel bandwidths up to 100 MHz for FR1 and 400 MHz for FR2, though there are circumstances where channel bandwidth is considerably smaller.

The method 400 begins at step 402 where the at least one processor receives a public warning system (PWS) alert message at the base station, e.g., a Write-Replace Warning Request (WRWR) message. For example, the PWS alert message may be received via a backhaul network 116 from a core network entity 112, e.g., an MME 112A for 4G or an AMF 112B for 5G.

In some configurations, the PWS alert message is a CMAS alert message that includes a warning message (WM) portion and optionally a corresponding warning area co-ordinate (WAC) portion. In other words, WAC is supported for CMAS but not for ETWS. As noted above, the maximum size of the warning message (WM) and corresponding warning area co-ordinate (WAC) in the PWSs may be larger than the maximum size of a SIBx message and thus the WM and WAC would need to be fragmented across multiple SIBx messages before it is transmitted over-the-air to UEs 110.

Alternatively, the PWS alert message may be a ETWS alert that includes only a warning message (WM) portion but no corresponding warning area co-ordinate (WAC) portion. In this case, the WM may still be fragmented across multiple SIBx messages before it is transmitted over-the-air to UEs 110, even if no WAC is present in the received PWS alert message.

Accordingly, the method 400 proceeds at step 404 where the at least one processor determines a number of bytes (SIBx_seg_size), based on a channel bandwidth of a wireless channel used by the base station, for each of a plurality of system information block (SIBx) messages. The SIBx messages are used to broadcast WM and WAC portions of the PWS alert message over-the-air to UEs 110. As the channel BW increases, the number of resource blocks ($numPRB_{SIBx}$) available for SIBx transmission may increase and therefore the TBS, which enables sending the entire PWS alert message across fewer SIBx messages. It should be noted, however, that there may be a cap on SIBx message size because the 3GPP specification limits the maximum size of a SIB s message.

In a 4G configuration, step 404 may include determining $numPRB_{SIBx}$ using Equation (B) above (where $numPRB_{SIBx}$ is the number PRBs available for SIB messages (larger for larger bandwidths)), then solving for SIBx_seg_size using Equation (C). This SIBx_seg_size is determined "based on a channel bandwidth of a wireless channel used by the wireless system" because $numPRB_{SIBx}$ will be larger for larger channel bandwidths. It should be noted that the 3GPP SIBx message size limitation is another factor that limits the maximum size of SIBx_seg_size. The 3GPP limitation on number of segments (e.g., max=64) may determine the minimum size of SIBx_seg_size.

In a 5G configuration, step 404 may include determining a number of bytes in a SIBx message (SIBx_seg_size) using Equation (D). This SIM_seg_size is determined "based on a channel bandwidth of a wireless channel used by the wireless system" because, as in 5G systems, $numPRB_{SIBx}$ will be larger for larger channel bandwidths. It should be noted that the 3GPP SIBx message size limitation is another factor that limits the maximum size of SIBx_seg_size. The 3GPP limitation on number of segments (e.g., max=64) may determine the minimum size of SIBx_seg_size.

In a first configuration of segmentation at the CU 103, each DU 105 is able to send a different number of SIBx messages for different cells 102 it serves, e.g., via RUs 106 utilizing the radio interface 107. In the second configuration of segmentation at the CU 103, a particular DU 105 uses the same segment size (SIBx message size) for all of its cells 102.

When segmentation is performed at the DU 105, the DU 105 can proactively use different segment sizes (SIBx message sizes) based on the cell 102 bandwidth and, thus, a different number of fragments may be sent in each cell 102, e.g., using Equation (B).

Whether a 4G configuration (using Equation (C) to determine SIBx_seg_size) or a 5G configuration (using Equation (D) to determine SIBx_seg_size), the determination of step 404 may also be based on the available number of PRBs for SIB s message ($numPRB_{SIBx}$), which may also be affected by the channel bandwidth, the modulation and coding rate used for SIBx transmission, the number of bits for cyclic redundancy check (CRC), and the number of symbols in a slot used for control and reference signals.

In practice, look-up tables may be used instead of (or in addition to) Equation (B), (C), and/or (D) to obtain one or more values. For example, Table 5 above may be used to look up the number of required PRBs ($N_{PRB}$) for a given TBS (SIBx message size) or vice-versa.

The method 400 may proceed at optional step 406 where the at least one processor allocates the number of bytes in each of a plurality of SIBx message to at least a warning message (WM) portion of the PWS alert message (and a corresponding warning area co-ordinate (WAC) portion of the PWS alert message, if present).

The method 400 may proceed at optional step 408 where the at least one processor transmits the plurality of SIBx messages to a plurality of RUs 106 (e.g., across a fronthaul network 118) for over-the-air broadcast to the plurality of UEs 110. The SIBx messages are transmitted over-the-air using the broadcast control channel (BCCH) mapped on the downlink shared channel (DL-SCH), which in turn mapped on physical downlink shared channel (PDSCH).

Allocating Bits in SIBx Messages to a Warning Message (WM) Portion and Warning Area Co-Ordinate (WAC) Portion of a PWS Alert Message Once the segment size (SIBx_seg_size), also referred to as SIBx message size, is determined, the pieces of the WM and/or WAC need to be packed in each segment (SIBx message). But the 3GPP standard does not specify a method to pack or distribute the data between WM and WAC information elements (IEs) in the SIB 12 (4G) or SIB 8 (5G) message. Additionally, there are constraints as seen in the SIB8 or SIB 12 data structure below where (1) warningMessageSegment is a mandatory field in every SIBx message; (2) warningAreaCoordinatesSegment can be sent only when WM is present; and (3) the limit on the number of SIBx messages when either WM or WM+WAC needs to be transmitted is 64.

Shown below is the format of each SIB8 or SIB12 transmission. Optimizations can be made to apportion between the WM and WAC so that the fewest SIBx messages are used to transmit the PWS alert message for a given SIBx message size.

```
SIB8 ::= SEQUENCE {
messageIdentifier BIT STRING (SIZE (16)),
serialNumber BIT STRING (SIZE (16)),
warningMessageSegmentType ENUMERATED {notLastSegment,
lastSegment},
warningMessageSegmentNumber INTEGER (0..63),
warningMessageSegment OCTET STRING,
dataCodingScheme OCTET STRING (SIZE (1)) OPTIONAL, -- Cond
Segment1
warningAreaCoordinatesSegment OCTET STRING OPTIONAL,
-- Need R
lateNonCriticalExtension OCTET STRING OPTIONAL,
... }
SystemInformationBlockType12-r9 ::= SEQUENCE {
messageIdentifier-r9 BIT STRING (SIZE (16)),
serialNumber-r9 BIT STRING (SIZE (16)),
warningMessageSegmentType-r9 ENUMERATED {notLastSegment,
lastSegment},
warningMessageSegmentNumber-r9 INTEGER (0..63),
warningMessageSegment-r9 OCTET STRING,
dataCodingScheme-r9 OCTET STRING (SIZE (1)) OPTIONAL, -- Cond
Segment1
lateNonCriticalExtension OCTET STRING OPTIONAL,
...,
[[ warningAreaCoordinatesSegment-r15 OCTET STRING OPTIONAL
-- Need OR
]] }
```

Figure 5:
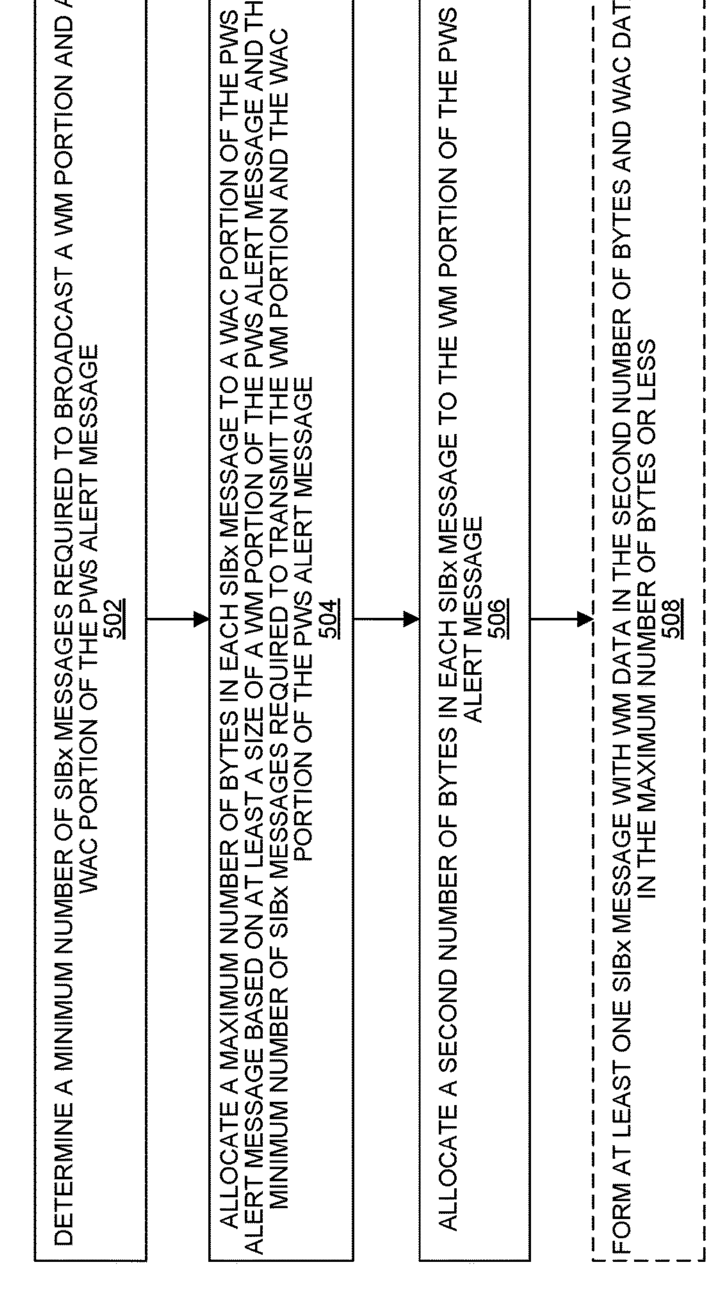
FIG. 5 is a flow diagram illustrating a method for allocating bytes in System Information Block (SIB) messages to a warning message (WM) and a corresponding warning area coordinate (WAC) from a Public Warning System (PWS) alert.

FIG. 5 is a flow diagram illustrating a method 500 for allocating bytes in System Information Block (SIB) messages to a warning message (WM) and a corresponding warning area coordinate (WAC) from a Public Warning System (PWS) alert. The method 500 may be performed by at least a controller (e.g., a CU 103 and/or DU(s) 105, and/or a baseband controller 104) of a base station, e.g., a 4G eNB, such as a C-RAN 100A, or a 5G gNB, such as a C-RAN 100B. The controller(s) may include a respective at least one processor executing instructions stored in memory.

The blocks of the flow diagram shown in FIG. 5 have been arranged in a generally sequential manner for ease of explanation; however, it is to be understood that this arrangement is merely exemplary, and it should be recognized that the processing associated with method 500 (and the blocks shown in FIG. 5) can occur in a different order (for example, where at least some of the processing associated with the blocks is performed in parallel and/or in an event-driven manner). Also, most standard exception handling is not described for ease of explanation; however, it is to be understood that method 500 can and typically would include such exception handling.

Once a suitable SIBx_seg_size is determined (e.g., as described in step 404 the method of FIG. 4 or via any other methodology), the bytes in the CMAS PWS alert message need to be allocated to WM and WAC portions in each SIBx message in a way that minimizes the number of SIBx messages required to transmit the entire WM and WAC portions. Therefore, in some configurations, the method 500 is one example implementation of step 406 in the method 400 of FIG. 4. Alternatively, the method 500 could be implemented separate and apart from the method 400 of FIG. 4 entirely, e.g., where the number of bytes (SIBx_seg_size) for system information block (SIBx) messages used to broadcast segments of the PWS alert message was previously determined but not using Equations (C) and/or (D) above.

It should be noted that 3GPP standards prevent a WAC message or a WAC portion from being transmitted alone in a SIBx message, i.e., WAC messages or WAC portions must be accompanied by the WM message or a WM segment in the same SIBx message. The method 500 allocates bytes in System Information Block (SIB) messages to the WM portion and the WAC portion, for a given SIBx message size, while still complying with various constraints imposed by the 3GPP standards.

The method 500 begins in step 502 where the at least one processor determines a minimum number of SIBx messages (Min_Frags_req) required to broadcast a warning message (WM) portion and a warning area co-ordinate (WAC) portion of the PWS alert message. This determination can be based on a size of the PWS alert message and the number of bytes for the SIBx messages, e.g., according to Equation (E):

$$\text{Min\_Frags\_req}=\text{ceiling}(\text{Alert\_size}/\text{SIBx\_seg\_size}) \quad \text{Equation (E)}$$

where Min_Frags_req is the minimum number of SIBx messages needed to send the entire WM and WAC portions of the received PWS alert message; Alert_size is the size of the PWS alert; and SIBx_seg_size is the SIBx message size; and where ceiling(X) is a ceiling operator that produces the least integer greater than or equal to X (e.g., ceiling(5.3)=ceiling(5.9)=5; ceiling(8)=8). The Alert_size, which is the sum of WM and WAC size, is computed from the PWS alert message (e.g., Write-Replace Warning Request message).

As before, the PWS alert message (e.g., Write-Replace Warning Request (WRWR) message) may be received at a controller via a backhaul network 116 from a core network 112, e.g., an MME 112A for 4G or an AMF 112B for 5G. In some configurations, the PWS alert message is a CMAS alert message that includes a warning message (WM) portion and corresponding warning area co-ordinate (WAC) portion.

The number of bytes for the SIBx messages (SIBx_seg_size) used in step 502 may be determined as outlined in step 404 of the method 400 of FIG. 4, e.g., using Equations (C) and/or (D). Alternatively, SIBx_seg_size used in step 502 may be determined any other suitable way.

The method 500 proceeds at step 504 where the at least one processor allocates a maximum number of bytes in each SIBx message to the WAC portion of the PWS alert message, e.g., based on at least a size of the WM portion ($WM_{size}$) of the PWS alert message and the minimum number of SIBx messages required to transmit the WM portion and the WAC portion of the PWS alert message (Optimal_Max_WAC_segment_size). If no WAC message is present, the WM can be divided into equal portions and sent in different SIBx messages. If a WAC portion is present in the SIBx message, the optimal max number of bytes for WAC in a SIBx message can be determined by Equation (F):

$$\text{Optimal\_Max\_WAC\_segment\_size} = \text{SIBx\_seg\_size} - \max\left(1, \text{floor}\left(\frac{WM_{size}}{\text{Min\_Frags\_req}}\right)\right) \quad \text{Eq. (F)}$$

where max(A,B) is an operator that selects the maximum of A and B; floor(X) is a floor operator that produces the greatest integer less than or equal to X (e.g., floor(5.3)=floor (5.9)=5; floor(8)=8); SIBx_seg_size is the SIBx message size; $WM_{size}$ is the size of the WM portion of the PWS alert message; and Min_Frags_req is the minimum number of SIBx messages required to send the entire WM and WAC portions of the received PWS alert message. Because a WAC message or segment must be accompanied by a WM message or a WM segment, the airlink resource will be used most efficiently when each SIBx message contains only new WM segment or minimum WM data repetition. Following Equation (F) and SIBx message packing rules detailed in sections below, when $WM_{size}$>=Min_Frags_req, each of the Min_Frag_req SIBx message will contain at least 1 byte of new WM data and there is no need to repeat WM to accompany a new WAC data segment. When $WM_{size}$ (in bytes)<Min_Frags_req, Optimal_Max_WAC_segment_size=SIBx_seg_size−1, the first $WM_{size}$ number of SIBx message will contain 1 byte of new WM data, the remaining SIBx messages contain the last byte of the WM message and new WAC data segments. Since Equation (F) and packing rules ensures no repetition or minimum repetition of 1 byte of WM data, Equation (F) gives the optimal WAC and WM segment size and the packing rules ensure the minimum of segments are used.

The method 500 proceeds at step 506 where the at least one processor allocates a second number of bytes in each SIBx message (after allocating to the WAC portion in step 508) to the WM portion of the PWS alert message. If x and y are the sizes of WM and WAC portions, respectively, in any SIBx fragment, the following relationships in Equations (G) and (H) hold true:

$$0 \leq y \leq \text{Optimal\_Max\_WAC\_segment\_size} \quad \text{Equation (G)}$$

$$0 < x \leq \text{SIB}_x\text{\_seg\_size} - y \quad \text{Equation (H)}$$

In other words, the second number of bytes may be the remaining bytes in the SIBx message after bytes in the SIBx message are allocated to WAC data in step 504.

The method 500 proceeds at optional step 508 where the at least one processor forms the SIBx message(s) with WM data in the second number of bytes (x) and WAC data in the maximum number of bytes (y) or less. Specifically, y=Optimal_Max_WAC_segment_size for all WAC segment except for the last portion of WAC which could be less than Optimal_Max_WAC_segment_size, and the remaining bytes x=SIBx_seg_size−y in the SIBx message are filled with bytes from the WM portion of the PWS alert message. Thus, WAC and WM information elements (from the PWS alert message) are transmitted in the same SIBx messages until either WM or WAC portions of the PWS alert message have been fully sent. If the WAC portions of the PWS alert message have fully been transmitted first, any unused bytes in SIBx_seg_size are then used to transmit the WM till WM is fully transmitted. If WM portions of the PWS alert message have fully been transmitted, the last segment of WM is repeated and the unused bytes in SIBx_seg_size are then used to transmit the WAC until WAC is fully transmitted. The repetition here is used to abide by the 3GPP restriction that a WAC (whole or fragment) must be accompanied by a WM (whole or fragment). The whole last WM segment has to be repeated to accompany a new WAC segment otherwise the UE will overwrite the last WM segment stored by the newly received 'last segment' and lead to WM corruption. Choosing Optional_Max_WAC_segment_size (Equation (F)) may ensure the repetition of WM only happens when WMsize<Min_Frags_req (see below) with a repetition size of 1 byte. Therefore, the systems and methods described herein ensure the minimum number of SIBx messages are used to transmit WM+MAC for a given SIBx_segment_size.

When $WM_{size}$ (in bytes)>Min_Frags_req, Equation (F) above reduces to Equation (I):

$$\text{Optimal\_Max\_WAC\_segment\_size} = \text{SIBx\_seg\_size} - \left(\text{floor}\left(\frac{WM_{size}}{\text{Min\_Frags\_req}}\right)\right) \quad \text{Equation (I)}$$

Depending on $WM_{size}$, $WAC_{size}$, and SIBx_seg_size, the transmissions of the WM and WAC portions of the PWS alert message may be completed together in Min_Frags_req SIBx messages or the WAC portion can be completed earlier. If the WAC portion is completed earlier, then the WAC portions will be fully transmitted in the first N=ceiling ($WAC_{size}$/Optimal_Max_WAC_segment_size) number of SIBx messages. The unused portion of Optimal_Max_WAC_segment_size in the N-th to the (Min_Frags_req)-th SIBx messages will be used to transmit the remaining WM message and the entire PWS alert message (WM and WAC portions) is transmitted in Min_Frags_req SIBx messages because Equation (E).

As described above, when Optimal_Max_WAC_segment_size is used from Equation (F), then the WM portion of the PWS alert message always takes Min_Frags_req SIBx messages to transmit when WMsize>=Min_Frags_req. When Optimal_Max_WAC_segment_size is not used, this can result in sub-optimality and in some cases the WM portion of the PWS alert message can complete transmission sooner than the WAC portion of the PWS alert message. In that case, the last WM information segment that was transmitted will have to be repeated in the remaining SIBx messages until all WAC information are also transmitted (because WAC information elements cannot be sent in SIBx messages without WM information elements). In other words, once the WM transmissions are completed, the remaining WAC information elements will be transmitted using SIBx_seg_size-(size of (last segment of WM)). Thus when the Optimal_Max_WAC_segment_size is not used, it may result in airlink inefficiency, longer time to transmit the whole PWS alert message in some cases.

Theoretically, it is possible that $WM_{size}$ (in bytes)< Min_Frags_req, but it this situation is unlikely in a practical PWS, since the minimum page size (3GPP 23.041) that is used to carry the CBC message is 84 bytes (including 2 bytes for header), where padding is applied if the original WM content if the size less than 82 bytes, making the minimum WM size to be 84 bytes.

The condition WMsize<Min_Frags_req is met when WM is in range of 1 to floor(max($WAC_{size}$)/SIBx_seg_size) bytes. For example, for a WAC of $WAC_{size}$=1024 bytes, SIBx_seg_size=170 bytes, this condition occurs when WM msg is in the range of 1 to 6 bytes.

When WMsize (in bytes)<Min_Frags_req, y=Optimal_Max_WAC_segment_size=SIBx_seg_size−1 per Equation (F), and x=1 (Equation I). Once WM is finished transmission in the (WMsize)-th SIBx message, only the last byte of WM message is repeated in the remaining SIBx messages used to finish transmission of WAC.

It should be noted that in both the cases (where WMsize>=Min_Frags_req or WMsize<Min_Frags_req), if Optimal_Max_WAC_segment_size is used, then the transmission of both the WM and WAC portions of the PWS alert message is completed in the least number of fragments.

Example 1

In Example 1, the WM portion of the PWS alert message is 820 octets, the WAC portion in the PWS alert is 660 octets, and the determined SIB8_msg_size is 170 bytes. In this example, Optimal_Max_WAC_segment_size=79 bytes (Equation (F)), and Min_Frags_req=9 SIBx messages (Equation (E)). The WM and WAC byte allocations for the 9 SIBx messages would look like this:

$$WM = 91\ 91\ 91\ 91\ 91\ 91\ 91\ 91\ 92$$

$$WAC = 79\ 79\ 79\ 79\ 79\ 79\ 79\ 79\ 28$$

Since Optimal_Max_WAC_segment_size=79 bytes, a maximum of 79 bytes are used for WAC information elements in any given SIBx message and the remaining are used for WM information elements. This allocation continues for each SIBx message, until the 9th SIBx message needs only 28 bytes to complete transmitting the WAC portion of the PWS alert message, while 92 bytes are used for WM information elements in the 9th SIBx message.

In contrast, if a suboptimal Max_WAC_segment_size of 50 bytes were used for WAC as shown below, it would take 12 SIBx messages, meaning 3 extra SIBx messages to transmit the 820-byte WM and the 660-byte WAC. where the WM portions in the last four SIBx messages are repeated information elements from the 7th SIBx message since the warningMessageSegmentType is a mandatory field that needs to be filled in any SIBx (e.g., SIB8, SIB12) transmission.

$$WM = 120\ 120\ 120\ 120\ 120\ 120\ 100\ 100\ 100\ 100\ 100\ 100$$

$$WAC = 50\ 50\ 50\ 50\ 50\ 50\ 70\ 70\ 70\ 70\ 70\ 10$$

In another example, if a system transmits WM message first, i.e. use a segment size 0 for WAC to begin with, then a total 26 SIBx messages are need to transmit the 820-byte WM+660-byte WAC. As illustrated below in this unoptimized scheme, only WM information elements are sent in the first 4 SIBx messages, the last WM segment of 140 bytes is transmitted in the 5th SIBx message together with 30 bytes of WAC fragment. The last WM segment of 140 bytes are repeated in following SIBx messages with 30 bytes of new WAC data in each message. Additional 17 SIBx messages are used to complete the whole PWS transmission.

$$WM = 170\ 170\ 170\ 170\ 140\ 140\ 140\ 140\ 140\ 140\ 140\ 140$$

$$140\ \ 140\ 140\ 140\ 140\ 140\ 140\ 140\ 140\ 140\ 140\ 140\ \ 140$$

$$140$$

$$WAC = 0\ 0\ 0\ 0\ 0\ 30\ 30\ 30\ 30\ 30\ 30\ 30$$

$$30\ \ 30\ 30\ 30\ 30\ 30\ 30\ 30\ 30\ 30\ 30\ 30\ \ 30$$

$$30$$

where the WM portions in the last 21 SIBx messages are repeated information elements from the 5th SIBx message since the warningMessageSegmentType (see above) is a field that needs to be filled in any SIBx (e.g., SIB8) transmission.

Example 2

In Example 2, the WM portion of the PWS alert message is 220 octets, the WAC portion in the PWS alert message is 660 octets, and the determined SIB8_msg_size is 200 bytes. In this example, Optimal_Max_WAC_segment_size=156 bytes, and Min_Frags_req=5 SIBx messages. In this example, the WM and WAC byte allocations for the 5 SIBx messages would look like this:

$$WM = 44\ 44\ 44\ 44\ 44$$

$$WAC = 156\ 156\ 156\ 156\ 36$$

In contrast, if a Suboptimal Max_WAC_segment_size of 85 bytes were used, Min_Frags_req would be 8 SIBx messages, meaning 3 extra SIBx messages would be sent compared to using an Optimal_Max_WAC_segment_size of 156 bytes, e.g., determined from Equation (G):

$$WM = 115\ \ 105\ \ 105\ \ 105\ \ 105\ \ 105\ \ 105\ \ 105$$

$$WAC = 85\ \ 95\ \ 95\ \ 95\ \ 95\ \ 95\ \ 95\ \ 5$$

where the WM portions in the last 6 SIBx messages are repeated information elements from the 2nd SIBx message since the warningMessageSegmentType (see above) is a field that needs to be filled in any SIBx (e.g., SIB8) transmission.

Example 3

In Example 3, the WM portion of the PWS alert message is 850 octets, the WAC portion in the PWS alert message is 100 octets, and the determined SIB8_msg_size is 170 bytes. In this example, Optimal_Max_WAC_segment_size=29 bytes, and Min_Frags_req=6 SIBx messages. In this example, the WM and WAC byte allocations for the 6 SIBx messages would look like this:

$$WM = 141\ \ 141\ \ 141\ \ 157\ \ 170\ \ 100$$

$$WAC = 29\ \ 29\ \ 29\ \ 13\ \ 0\ \ 0$$

Example 4

In Example 4, the WM portion of the PWS alert message is 5 octets, the WAC portion in the PWS alert message is 1100 octets, and the determined SIB8_msg_size is 170 bytes. In this example, Optimal_Max_WAC_segment_size=169 bytes, and Min_Frags_req=7 SIBx messages. In this example, the WM and WAC byte allocations for the 7 SIBx messages would look like this:

$$WM = 1\ \ 1\ \ 1\ \ 1\ \ 1\ \ 1\ \ 1$$

$$WAC = 169\ \ 169\ \ 169\ \ 169\ \ 169\ \ 169\ \ 86$$

Here, the size of the WM portion of the PWS alert message (5) is smaller than the Min_Frags_req (7), thus the WM information elements in the last two SIBx messages are repeated.

EXAMPLES

Example 1 includes a base station, comprising: a plurality of remote units (RUs), each being configured to exchange radio frequency (RF) signals with at least one user equipment (UE); a controller communicatively coupled to the plurality of RUs via a fronthaul interface, the controller being configured to: receive a public warning system (PWS) alert message; determine a number of bytes, based on a channel bandwidth of a wireless channel used by the base station, for each of a plurality of system information block messages; wherein the plurality of system information block messages are broadcast wirelessly to the at least one UE.

Example 2 includes the base station of Example 1, wherein the controller is a Distributed Unit (DU), a Central Unit (CU), or a combination of the CU and the DU configured to operate in a 3GPP Fifth Generation communication system.

Example 3 includes the base station of any of Examples 1-2, wherein the controller is a baseband controller configured to operate in a 3GPP Long Term Evolution communication system.

Example 4 includes the base station of any of Examples 1-3, wherein the PWS alert message comprises a warning message portion and corresponding warning area co-ordinate portion, if present.

Example 5 includes the base station of any of Examples 1-4, wherein the PWS alert message is larger than a maximum allowable size for the plurality of system information block messages.

Example 6 includes the base station of any of Examples 1-5, wherein the number of bytes for each of the plurality of system information block messages is further based on at least one of the following parameters: a code rate used to transmit the plurality of system information block messages, the available number of physical resource blocks not otherwise reserved for other downlink traffic, the number of bits for cyclic redundancy check, and a modulation scheme used to carry system information, and/or a number of symbols in a resource block for control and reference symbols.

Example 7 includes the base station of any of Examples 1-6, wherein the controller is further configured to allocate the number of bytes in each of the plurality of system information block message to at least a warning message portion of the PWS alert message.

Example 8 includes the base station of any of Examples 1-7, wherein the controller is further configured to allocate the number of bytes in each of the plurality of system information block message to at least a warning message portion of the PWS alert message and a corresponding warning area co-ordinate portion of the PWS alert message.

Example 9 includes the base station of any of Examples 1-8, wherein the controller is further configured to transmit the plurality of system information block messages to a plurality of RUs for wireless broadcast to the at least one UE.

Example 10 includes the base station of any of Examples 1-9, wherein a first channel bandwidth in a first configuration results in fewer, larger system information block messages compared to a second channel bandwidth in a second configuration that is smaller than the first channel bandwidth, when other parameters are the same for the first and second configurations.

Example 11 includes a method performed by a controller in a base station, the method comprising: receiving a public warning system (PWS) alert message; determining a number of bytes, based on a channel bandwidth of a wireless channel used by the base station, for each of a plurality of system information block messages; wherein the plurality of system information block messages are broadcast wirelessly to the at least one UE.

Example 12 includes the method of Example 11, wherein the controller is a Distributed Unit (DU), a Central Unit (CU), or a combination of the CU and the DU configured to operate in a 3GPP Fifth Generation communication system.

Example 13 includes the method of any of Examples 11-12, wherein the controller is a baseband controller, wherein the method further comprises communicating with the at least one UE via a 3GPP Long Term Evolution air interface.

Example 14 includes the method of any of Examples 11-13, wherein the PWS alert message comprises a warning message portion and corresponding warning area co-ordinate portion, if present.

Example 15 includes the method of any of Examples 11-14, wherein the PWS alert message is larger than a maximum allowable size for the plurality of system information block messages.

Example 16 includes the method of any of Examples 11-15, wherein the number of bytes for each of the plurality of system information block messages is further based on at least one of the following parameters: a code rate used to transmit the plurality of system information block messages, the available number of physical resource blocks not otherwise reserved for other downlink traffic, the number of bits for cyclic redundancy check, and a modulation scheme used to carry system information, and/or a number of symbols in a resource block for control and reference symbols.

Example 17 includes the method of any of Examples 11-16, further comprising allocating the number of bytes in each of the plurality of system information block message to at least a warning message portion of the PWS alert message.

Example 18 includes the method of any of Examples 11-17, further comprising allocating the number of bytes in each of the plurality of system information block message to at least a warning message portion of the PWS alert message and a corresponding warning area co-ordinate portion of the PWS alert message.

Example 19 includes the method of any of Examples 11-18, further comprising transmitting the plurality of system information block messages to a plurality of RUs for wireless broadcast to the at least one UE.

Example 20 includes the base station of any of Examples 11-19, wherein a first channel bandwidth in a first configuration results in fewer, larger system information block messages compared to a second channel bandwidth in a second configuration that is smaller than the first channel bandwidth, when other parameters are the same for the first and second configurations.

Example 21 includes a base station, comprising: a plurality of remote units (RUs), each being configured to exchange radio frequency (RF) signals with at least one user equipment (UE); a controller communicatively coupled to the plurality of RUs via a fronthaul interface, the controller being configured to: determine a minimum number of system information block messages required to broadcast a warning message (WM) portion and a warning area co-ordinate (WAC) portion of a PWS alert message; allocate a maximum number of bytes in each system information block message to the WAC portion of the PWS alert message based on at least a size of the WM portion of the PWS alert message and the minimum number of system information block messages required to transmit the WM portion and the WAC portion of the PWS alert message; allocate a second number of bytes in each system information block message, after allocating for the WAC portion, to the WM portion of the PWS alert message; form the system information block messages with WM data in the second number of bytes and WAC data in the maximum number of bytes or less.

Example 22 includes the base station of Example 21, wherein the controller is a Distributed Unit (DU), a Central Unit (CU), or a combination of the CU and the DU configured to operate in a 3GPP Fifth Generation communication system.

Example 23 includes the base station of any of Examples 21-22, wherein the controller is a baseband controller configured to operate in a 3GPP Long Term Evolution communication system.

Example 24 includes the base station of any of Examples 21-23, wherein the minimum number of system information block messages required to broadcast the WM portion and the WAC portion of the PWS alert message is determined based on a size of the PWS alert message and a number of bytes for the system information block messages.

Example 25 includes the base station of any of Examples 21-24, wherein the PWS alert message is received from a core network entity via a backhaul network.

Example 26 includes the base station of any of Examples 21-25, wherein when the size of the WM portion of the PWS alert message is less than the minimum number of system information block messages required to transmit the WM portion and the WAC portion of the PWS alert message, the maximum number of bytes is further based on whether the ratio of the size of the WM portion to the minimum number of system information block messages is less than any of Examples 1-25.

Example 27 includes the base station of any of Examples 21-26, wherein when the size of the WM portion of the PWS alert message is less than the minimum number of system information block messages required to transmit the WM portion and the WAC portion of the PWS alert message, a last byte of WM data from the PWS alert message is repeated in at least one of the system information block messages.

Example 28 includes the base station of any of Examples 21-27, wherein the controller is further configured to transmit the plurality of system information block messages to a plurality of RUs for wireless broadcast to the at least one UE.

Example 29 includes the base station of any of Examples 21-28, wherein fewer than the maximum number of bytes are used for WAC data in at least one of the system information block messages.

Example 30 includes the base station of any of Examples 21-29, wherein WAC data is only sent in system information block messages that also include WM data.

Example 31 includes a method performed by a controller in a base station, the method comprising: determining a minimum number of system information block messages required to broadcast a warning message (WM) portion and a warning area co-ordinate (WAC) portion of a PWS alert message; allocating a maximum number of bytes in each system information block message to the WAC portion of the PWS alert message based on at least a size of the WM portion of the PWS alert message and the minimum number of system information block messages required to transmit the WM portion and the WAC portion of the PWS alert message; allocating a second number of bytes in each system information block message, after allocating for the WAC portion, to the WM portion of the PWS alert message; forming the system information block messages with WM data in the second number of bytes and WAC data in the maximum number of bytes or less.

Example 32 includes the method of Example 31, wherein the controller is a Distributed Unit (DU), a Central Unit (CU), or a combination of the CU and the DU configured to operate in a 3GPP Fifth Generation communication system.

Example 33 includes the method of any of Examples 31-32, wherein the controller is a baseband controller, wherein the method further comprises communicating with the at least one UE via a 3GPP Long Term Evolution air interface.

Example 34 includes the method of any of Examples 31-33, wherein the minimum number of system information block messages required to broadcast the WM portion and the WAC portion of the PWS alert message is determined based on a size of the PWS alert message and a number of bytes for the system information block messages.

Example 35 includes the method of any of Examples 31-34, wherein the PWS alert message is received from a core network entity via a backhaul network.

Example 36 includes the method of any of Examples 31-35, wherein when the size of the WM portion of the PWS alert message is less than the minimum number of system information block messages required to transmit the WM portion and the WAC portion of the PWS alert message, the maximum number of bytes is further based on whether the ratio of the size of the WM portion to the minimum number of system information block messages is less than any of Examples 1-35.

Example 37 includes the method of any of Examples 31-36, wherein when the size of the WM portion of the PWS alert message is less than the minimum number of system information block messages required to transmit the WM portion and the WAC portion of the PWS alert message, a last byte of WM data from the PWS alert message is repeated in at least one of the system information block messages.

Example 38 includes the method of any of Examples 31-37, further comprising transmitting the plurality of system information block messages to a plurality of RUs for wireless broadcast to the at least one UE.

Example 39 includes the method of any of Examples 31-38, wherein fewer than the maximum number of bytes are used for WAC data in at least one of the system information block messages after: allocating for the WAC portion, to the WM portion of the PWS alert message; and forming the system information block messages with WM data in the second number of bytes and WAC data in the maximum number of bytes.

Example 40 includes the method of any of Examples 31-39, wherein WAC data is only sent in system information block messages that also include WM data.

The invention claimed is:

1. A base station, comprising:

a plurality of remote units (RUs), each being configured to exchange radio frequency (RF) signals with at least one user equipment (UE);

a controller communicatively coupled to the plurality of RUs via a fronthaul interface, the controller being configured to:

receive a public warning system (PWS) alert message;

determine a number of bytes, based on a channel bandwidth of a wireless channel used by the base station, for each of a plurality of system information block messages;

wherein the plurality of system information block messages are broadcast wirelessly to the at least one UE.

2. The base station of claim 1, wherein the controller is a Distributed Unit (DU), a Central Unit (CU), or a combination of the CU and the DU configured to operate in a 3GPP Fifth Generation communication system.

3. The base station of claim 1, wherein the controller is a baseband controller configured to operate in a 3GPP Long Term Evolution communication system.

4. The base station of claim 1, wherein the PWS alert message comprises a warning message portion and corresponding warning area co-ordinate portion, if present.

5. The base station of claim 1, wherein the PWS alert message is larger than a maximum allowable size for the plurality of system information block messages.

6. The base station of claim 1, wherein the number of bytes for each of the plurality of system information block messages is further based on at least one of the following parameters: a code rate used to transmit the plurality of system information block messages, an available number of physical resource blocks not otherwise reserved for other downlink traffic, a number of bits for cyclic redundancy check, and a modulation scheme used to carry system information, and/or a number of symbols in a resource block for control and reference symbols.

7. The base station of claim 1, wherein the controller is further configured to allocate the number of bytes in each of the plurality of system information block message to at least a warning message portion of the PWS alert message.

8. The base station of claim 1, wherein the controller is further configured to allocate the number of bytes in each of the plurality of system information block message to at least a warning message portion of the PWS alert message and a corresponding warning area co-ordinate portion of the PWS alert message.

9. The base station of claim 1, wherein the controller is further configured to transmit the plurality of system information block messages to a plurality of RUs for wireless broadcast to the at least one UE.

10. The base station of claim 1, wherein a first channel bandwidth in a first configuration results in fewer, larger system information block messages compared to a second channel bandwidth in a second configuration that is smaller than the first channel bandwidth, when other parameters are the same for the first and second configurations.

11. A method performed by a controller in a base station, the method comprising:

receiving a public warning system (PWS) alert message;

determining a number of bytes, based on a channel bandwidth of a wireless channel used by the base station, for each of a plurality of system information block messages;

wherein the plurality of system information block messages are broadcast wirelessly to at least one UE.

12. The method of claim 11, wherein the controller is a Distributed Unit (DU), a Central Unit (CU), or a combination of the CU and the DU configured to operate in a 3GPP Fifth Generation communication system.

13. The method of claim 11, wherein the controller is a baseband controller, wherein the method further comprises communicating with the at least one UE via a 3GPP Long Term Evolution air interface.

14. The method of claim 11, wherein the PWS alert message comprises a warning message portion and corresponding warning area co-ordinate portion, if present.

15. The method of claim 11, wherein the PWS alert message is larger than a maximum allowable size for the plurality of system information block messages.

16. The method of claim 11, wherein the number of bytes for each of the plurality of system information block messages is further based on at least one of the following parameters: a code rate used to transmit the plurality of system information block messages, an available number of physical resource blocks not otherwise reserved for other downlink traffic, a number of bits for cyclic redundancy check, and a modulation scheme used to carry system information, and/or a number of symbols in a resource block for control and reference symbols.

17. The method of claim 11, further comprising allocating the number of bytes in each of the plurality of system information block message to at least a warning message portion of the PWS alert message.

18. The method of claim 11, further comprising allocating the number of bytes in each of the plurality of system information block message to at least a warning message portion of the PWS alert message and a corresponding warning area co-ordinate portion of the PWS alert message.

19. The method of claim 11, further comprising transmitting the plurality of system information block messages to a plurality of RUs for wireless broadcast to the at least one UE.

20. The base station of claim 11, wherein a first channel bandwidth in a first configuration results in fewer, larger system information block messages compared to a second channel bandwidth in a second configuration that is smaller than the first channel bandwidth, when other parameters are the same for the first and second configurations.

21. A base station, comprising:

a plurality of remote units (RUs), each being configured to exchange radio frequency (RF) signals with at least one user equipment (UE);

a controller communicatively coupled to the plurality of RUs via a fronthaul interface, the controller being configured to:

determine a minimum number of system information block messages required to broadcast a warning message (WM) portion and a warning area co-ordinate (WAC) portion of a PWS alert message;

allocate a maximum number of bytes in each system information block message to the WAC portion of the PWS alert message based on at least a size of the WM portion of the PWS alert message and the minimum number of system information block messages required to transmit the WM portion and the WAC portion of the PWS alert message;

allocate a second number of bytes in each system information block message, after allocating for the WAC portion, to the WM portion of the PWS alert message;

form the system information block messages with WM data in the second number of bytes and WAC data in the maximum number of bytes or less.

22. The base station of claim 21, wherein the controller is a Distributed Unit (DU), a Central Unit (CU), or a combination of the CU and the DU configured to operate in a 3GPP Fifth Generation communication system.

23. The base station of claim 21, wherein the controller is a baseband controller configured to operate in a 3GPP Long Term Evolution communication system.

24. The base station of claim 21, wherein the minimum number of system information block messages required to broadcast the WM portion and the WAC portion of the PWS alert message is determined based on a size of the PWS alert message and a number of bytes for the system information block messages.

25. The base station of claim 21, wherein the PWS alert message is received from a core network entity via a backhaul network.

26. The base station of claim 21, wherein when the size of the WM portion of the PWS alert message is less than the minimum number of system information block messages required to transmit the WM portion and the WAC portion of the PWS alert message, the maximum number of bytes is further based on whether a ratio of the size of the WM portion to the minimum number of system information block messages is less than 1.

27. The base station of claim 21, wherein when the size of the WM portion of the PWS alert message is less than the minimum number of system information block messages required to transmit the WM portion and the WAC portion of the PWS alert message, a last byte of WM data from the PWS alert message is repeated in at least one of the system information block messages.

28. The base station of claim 21, wherein the controller is further configured to transmit the plurality of system information block messages to a plurality of RUs for wireless broadcast to the at least one UE.

29. The base station of claim 21, wherein fewer than the maximum number of bytes are used for WAC data in at least one of the system information block messages.

30. The base station of claim 21, wherein WAC data is only sent in system information block messages that also include WM data.

31. A method performed by a controller in a base station, the method comprising:

determining a minimum number of system information block messages required to broadcast a warning message (WM) portion and a warning area co-ordinate (WAC) portion of a PWS alert message;

allocating a maximum number of bytes in each system information block message to the WAC portion of the PWS alert message based on at least a size of the WM portion of the PWS alert message and the minimum number of system information block messages required to transmit the WM portion and the WAC portion of the PWS alert message;

allocating a second number of bytes in each system information block message, after allocating for the WAC portion, to the WM portion of the PWS alert message;

forming the system information block messages with WM data in the second number of bytes and WAC data in the maximum number of bytes or less.

32. The method of claim 31, wherein the controller is a Distributed Unit (DU), a Central Unit (CU), or a combination of the CU and the DU configured to operate in a 3GPP Fifth Generation communication system.

33. The method of claim 31, wherein the controller is a baseband controller, wherein the method further comprises communicating with the at least one UE via a 3GPP Long Term Evolution air interface.

34. The method of claim 31, wherein the minimum number of system information block messages required to broadcast the WM portion and the WAC portion of the PWS alert message is determined based on a size of the PWS alert message and a number of bytes for the system information block messages.

35. The method of claim 31, wherein the PWS alert message is received from a core network entity via a backhaul network.

36. The method of claim 31, wherein when the size of the WM portion of the PWS alert message is less than the minimum number of system information block messages required to transmit the WM portion and the WAC portion of the PWS alert message, the maximum number of bytes is further based on whether a ratio of the size of the WM portion to the minimum number of system information block messages is less than 1.

37. The method of claim 31, wherein when the size of the WM portion of the PWS alert message is less than the minimum number of system information block messages required to transmit the WM portion and the WAC portion of the PWS alert message, a last byte of WM data from the PWS alert message is repeated in at least one of the system information block messages.

38. The method of claim 31, further comprising transmitting the plurality of system information block messages to a plurality of RUs for wireless broadcast to the at least one UE.

39. The method of claim 31, wherein fewer than the maximum number of bytes are used for WAC data in at least one of the system information block messages after:

allocating for the WAC portion, to the WM portion of the PWS alert message; and forming the system information block messages with WM data in the second number of bytes and WAC data in the maximum number of bytes.

40. The method of claim 31, wherein WAC data is only sent in system information block messages that also include WM data.

* * * * *